US 12,301,848 B2

(12) United States Patent
Gadgil et al.

(10) Patent No.: US 12,301,848 B2
(45) Date of Patent: May 13, 2025

(54) ADAPTIVE STREAMING WITH FALSE CONTOURING ALLEVIATION

(71) Applicant: DOLBY LABORATORIES LICENSING CORPORATION, San Francisco, CA (US)

(72) Inventors: Neeraj J. Gadgil, Pune (IN); Guan-Ming Su, Fremont, CA (US); Harshad Kadu, Santa Clara, CA (US)

(73) Assignee: DOLBY LABORATORIES LICENSING CORPORATION, San Francisco, CA (US)

(*) Notice: Subject to any disclaimer, the term of this patent is extended or adjusted under 35 U.S.C. 154(b) by 65 days.

(21) Appl. No.: 18/020,015

(22) PCT Filed: Aug. 5, 2021

(86) PCT No.: PCT/US2021/044811
§ 371 (c)(1),
(2) Date: Feb. 6, 2023

(87) PCT Pub. No.: WO2022/032010
PCT Pub. Date: Feb. 10, 2022

(65) Prior Publication Data
US 2023/0308667 A1      Sep. 28, 2023

Related U.S. Application Data

(60) Provisional application No. 63/061,937, filed on Aug. 6, 2020.

(30) Foreign Application Priority Data

Aug. 6, 2020   (EP) ..................................... 20189859

(51) Int. Cl.
*H04N 19/36*     (2014.01)
*H04N 19/132*    (2014.01)
(Continued)

(52) U.S. Cl.
CPC ........... *H04N 19/36* (2014.11); *H04N 19/132* (2014.11); *H04N 19/186* (2014.11); *H04N 19/46* (2014.11)

(58) Field of Classification Search
CPC .... H04N 19/36; H04N 19/132; H04N 19/186; H04N 19/46; H04N 19/85; H04N 19/117
(Continued)

(56) References Cited

U.S. PATENT DOCUMENTS 9,264,681 B2    2/2016  Gish
9,497,456 B2    11/2016 Su
(Continued)

FOREIGN PATENT DOCUMENTS

WO    2017015397 A1    1/2017
WO    2017165494 A2    9/2017
(Continued)

OTHER PUBLICATIONS

ITU-R "Reference electro-optical transfer function for flat panel displays used in HDTV Studio Production" Recommendation ITU-R BT. 1886, Mar. 2011.
(Continued)

*Primary Examiner* — Tung T Vo

(57) ABSTRACT

A forward reshaping mapping is generated to map a source image to a corresponding forward reshaped image of a lower dynamic range. The source image is spatially downsampled to generate a resized image into which noise is injected to generate a noise injected image. The forward reshaping mapping is applied to map the noise injected image to generate a noise embedded image of the lower dynamic range. A video signal is encoded with the noise embedded image and delivered to a recipient device for the recipient device to render a display image generated from the noise embedded image.

15 Claims, 14 Drawing Sheets

(51) Int. Cl.
*H04N 19/186* (2014.01)
*H04N 19/46* (2014.01)

(58) Field of Classification Search
USPC ..................................................... 375/240.2
See application file for complete search history.

(56) References Cited

U.S. PATENT DOCUMENTS

| | | | |
|---|---|---|---|
| 9,584,811 B2 | 2/2017 | Su | |
| 9,628,808 B2 | 4/2017 | Su | |
| 10,080,026 B2 | 9/2018 | Su | |
| 10,298,923 B2 | 5/2019 | Su | |
| 10,721,484 B2* | 7/2020 | Le Leannec | H04N 19/186 |
| 11,277,646 B2 | 3/2022 | Song | |
| 2015/0373369 A1* | 12/2015 | Jalali | H04N 19/136 375/240.12 |
| 2017/0085889 A1* | 3/2017 | Baylon | H04N 19/186 |
| 2019/0110054 A1 | 4/2019 | Su | |
| 2021/0350511 A1* | 11/2021 | Gadgil | G06T 5/92 |
| 2023/0050950 A1 | 2/2023 | Harshad | |
| 2023/0117813 A1* | 4/2023 | Deng | H04N 19/176 |

FOREIGN PATENT DOCUMENTS

| | | |
|---|---|---|
| WO | 2019036522 A1 | 2/2019 |
| WO | 2020068666 A1 | 4/2020 |
| WO | 2020072651 A1 | 4/2020 |
| WO | 2021108719 A1 | 6/2021 |
| WO | 2022164929 A1 | 8/2022 |

OTHER PUBLICATIONS

ITU-R BT. 2100 "Image Parameter Values for High Dynamic Range Television for Use in Production and International Programme Exchange" ITU, Jun. 2017.

Schroeder Damien, et al "Multi-Rate Encoding for HEVC-based Adaptive HTTP Streaming with Multiple Resolutions" IEEE 17th International Workshop on Multimedia Signal Processing, IEEE, Oct. 19, 2015, pp. 1-6.

SMPTE 2084:2014 "High Dynamic Range Electro-Optical Transfer Function of Mastering Reference Displays" Aug. 16, 2014.

Wikipedia "Linear-Feedback Shift Register" LFSR Wiki page: https://en.wikipedia.org/wiki/Linear-feedback_shift_register.

* cited by examiner

FIG. 3D

- 402 — FIND A RESPECTIVE PER-BIN CODEWORD INCREASE
- 404 — NORMALIZE PER-BIN CODEWORD INCREASES
- 406 — ASSIGN NOISE STRENGTHS ACCORDING TO THE PER-BIN CODEWORD INCREASES

FIG. 4A

ADAPTIVE STREAMING WITH FALSE CONTOURING ALLEVIATION

CROSS-REFERENCE TO RELATED APPLICATIONS

This application is a National Phase entry of PCT Patent Application No. PCT/US2021/044811, having international filing date of Aug. 5, 2021, which claims priority to U.S. Provisional Application No. 63/061,937 and European Patent Application No. 20189859.0, both filed on Aug. 6, 2020, each of which is incorporated by reference in its entirety.

TECHNOLOGY

The present disclosure relates generally to image processing operations. More particularly, an embodiment of the present disclosure relates to video codecs.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. While perhaps somewhat narrower in relation to true scene referred HDR, EDR nonetheless represents a wide DR breadth and may also be referred to as HDR.

In practice, images comprise one or more color components (e.g., luma Y and chroma Cb and Cr) of a color space, where each color component is represented by a precision of n-bits per pixel (e.g., n=8). Using non-linear luminance coding (e.g., gamma encoding), images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF may be embedded in the bitstream as (image) metadata. The term "metadata" herein relates to any auxiliary information transmitted as part of the coded bitstream and assists a decoder to render a decoded image. Such metadata may include, but is not limited to, color space or gamut information, reference display parameters, and auxiliary signal parameters, as those described herein.

The term "PQ" as used herein refers to perceptual luminance amplitude quantization. The human visual system responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In some embodiments, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays" (hereinafter "SMPTE"), which is incorporated herein by reference in its entirety, where given a fixed stimulus size, for every luminance level (e.g., the stimulus level, etc.), a minimum visible contrast step at that luminance level is selected according to the most sensitive adaptation level and the most sensitive spatial frequency (according to HVS models).

Displays that support luminance of 200 to 1,000 cd/m$^2$ or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 or more nits). An example of such an EOTF is defined in SMPTE 2084 and Rec. ITU-R BT.2100. "Image parameter values for high dynamic range television for use in production and international programme exchange," (June 2017). As appreciated by the inventors here, improved techniques for composing video content data that can be used to deliver media content to, and support display capabilities of, a wide variety of SDR and HDR display devices including mobile devices are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not by way of limitation, in the figures of the accompanying drawings and in which like reference numerals refer to similar elements and in which:

FIG. 3D illustrates an example frequency domain pattern or block for generating noise images;

FIG. 4A through FIG. 4C illustrate example process flows; and

DESCRIPTION OF EXAMPLE EMBODIMENTS

Figure 1:
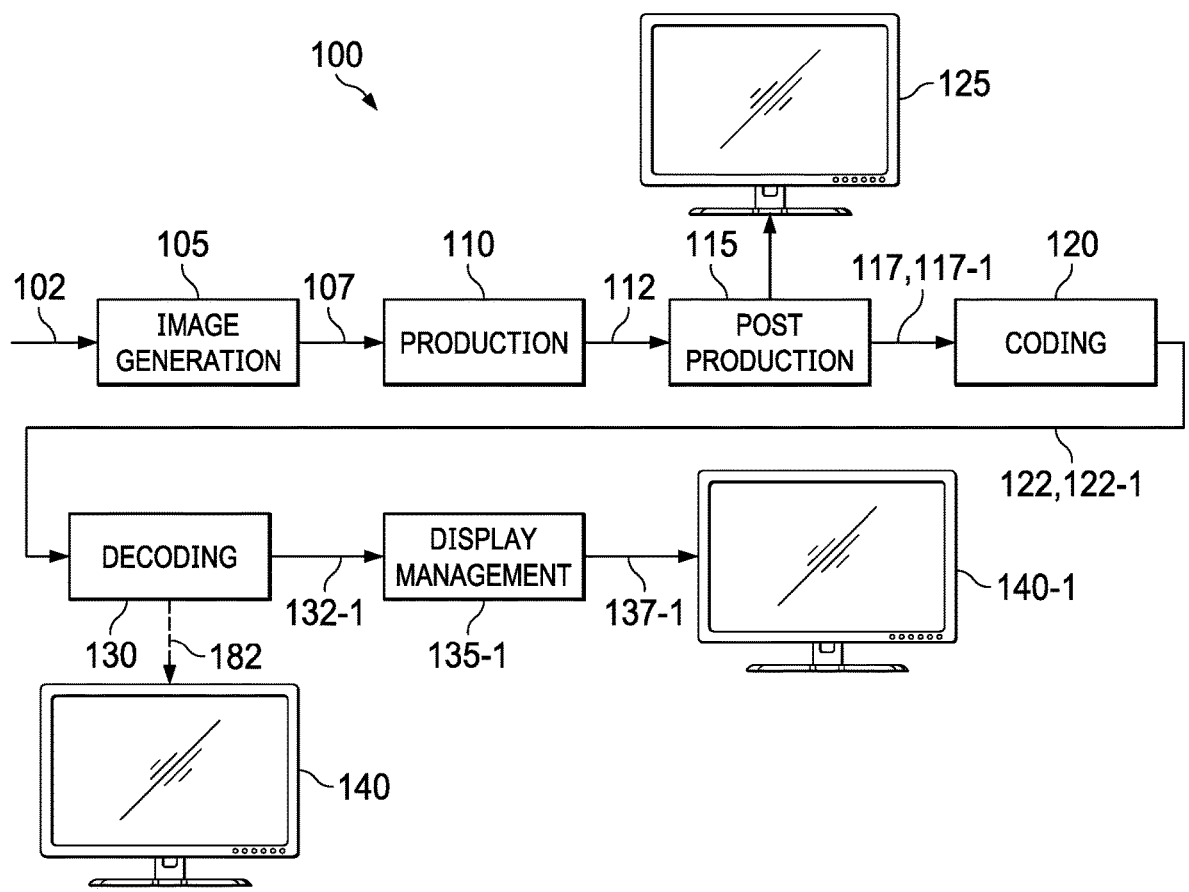
FIG. 1 depicts an example process of a video delivery pipeline.

In the following description, for the purposes of explanation, numerous specific details are set forth in order to provide a thorough understanding of the present disclosure. It will be apparent, however, that the present disclosure may be practiced without these specific details. In other instances, well-known structures and devices are not described in exhaustive detail, in order to avoid unnecessarily occluding, obscuring, or obfuscating the present disclosure.

SUMMARY

Techniques as described herein can be implemented to support or provide an adaptive streaming framework in which video contents with effective banding alleviation can be adaptively streamed to end user devices with relatively moderate decoding and/or display capabilities. The adaptive streaming framework may implement a video-coding-based multi-resolution/bitrate ladder in which multiple spatial resolution video signals can be generated for adaptive streaming to the end user devices. Example end user devices may include, but are not necessarily limited to only, mobile devices with 8-bit or 10-bit video codecs, such as Advanced Video Coding (AVC), HEVC, AV1, and the like, codecs.

While an 8-bit video signal would typically be highly susceptible for banding artifacts under other approaches that do not implement techniques as described herein, under techniques as described herein, noise such as film-grain noise can be injected with luminance-dependent noise strength into an HDR video signal used for generating a video signal—including an 8-bit video signal—to achieve effective false contouring or banding alleviation.

Adaptive streaming with banding alleviation may be implemented in a variety of system configurations (or architectures). In an example, adaptive video streaming with banding alleviation can operate in conjunction with segment/node style parallel processing. In another example, adaptive video streaming with banding alleviation can operate in conjunction with linear/live encoding such as broadcasting applications.

Multiple video signals at multiple spatial resolutions and/or multiple bitrates may be used by a media streaming system or service, which may be referred to as a media streamer, to support adaptive streaming. Each of these multiple video signals depicts the same visual semantic content as the input source HDR video signal and may be generated from the input source HDR video signal by the media streamer.

The media streamer can dynamically adapt media streaming operations that stream video content to a given media streaming client—including but not limited to a mobile client device—depending on some or all of a variety of client-specific media streaming conditions/factors. These client-specific media streaming conditions/factors may include, but are not necessarily limited to only, any of: network conditions or bandwidths, available system resources, transmission and/or system latencies, user specific settings/selections, etc.

At a given time, the media streamer can stream, to the given media streaming client, one or more video segments or stream portions of a specifically selected video signal of a specific spatial resolution and/or a specific bitrate. The specific video signal may be (e.g., dynamically, in real time, in run time, etc.) selected from the multiple video signals of the multiple spatial resolutions and/or multiple bitrates depending on some or all of the real time or non-real-time streaming conditions/factors specific and/or general to the given media streaming client.

In some operational scenarios, a media streamer as described herein may implement a system configuration containing multiple instances of a full media processing pipeline. Each instance of the full media processing pipeline may be used to generate a respective video signal in the multiple video signals of different settings or combinations of supported spatial resolutions and/or supported bit rates. For example, the full media processing pipeline or each instance thereof may generate forward and backward reshaping mappings between (input) source images and base-layer (BL) images; inject noise into the source images for the purpose of alleviating or preventing false contouring artifacts; resize or spatially downsample the noise injected source images; forward reshape the resized noise injected source images into reshaped noise embedded (e.g., banding masked, noise injected, etc.) BL images; encode/compress the noise injected BL images into a respective video signal, etc.

In some operational scenarios, a media streamer as described herein may implement a system configuration for multi-stage encoding. By way of illustration but not limitation, the media streamer may implement a two-stage system configuration—including but not limited to a two-stage single-layer-backward-compatible (SLBC) encoder system configuration or architecture—that comprises a first stage to perform a first part of the full media processing pipeline as previously mentioned and a second stage to perform the remaining part of the full media processing pipeline.

The system configuration for multi-stage encoding can be designed to relatively efficiently encode video content for adaptive streaming applications and leverage cloud computing resources to create multiple coded bitstreams with multiple combinations of spatial resolutions (or picture resolutions) and bitrates. The media streamer may implement a single instance of the first stage and multiple instances of the second stage for the purpose of generating multiple video signals of different settings or combinations of supported spatial resolutions and/or supported bit rates in the bit rate ladder. In the two-stage system configuration, multiple coded bitstreams can be encoded and outputted using the forward reshaping data and a film-grain noise injection mechanism. Noise injection including but not limited to film grain injection can be used to mask or significantly reduce false contouring artifacts and thus significantly improve visual quality when video content are rendered on end-user devices such as mobile phones.

The first part of the full media processing pipeline is performed by the first encoding stage of the two-stage system configuration and includes: generating forward and backward reshaping mappings between (input) source images and base layer (BL) images, passing forward binary data derived from the forward reshaping mapping to the second stage, etc. The forward and backward reshaping mappings enable conversion between video content of a relatively high dynamic range (e.g., EDR, etc.) and video content of a relatively low dynamic range (e.g., SDR, etc.) back and forth. The HDR video content and the SDR video content may depict the same visual semantic content albeit with different dynamic ranges (e.g., different luminance ranges, etc.)

The second part of the full media processing pipeline is performed by each instance of the multiple instances of the second encoding stage of the two-stage system configuration and includes: receiving the forward binary data from the first stage, resizing or spatially downsampling the source images, using the forward binary data to determine luminance-dependent noise strength, injecting noise with the determined luminance-dependent noise strength into the resized source images for the purpose of alleviating or preventing false contouring artifacts, forward reshaping the resized noise injected source images into noise embedded BL images, encoding/compressing the noise embedded BL images into a respective video signal in the multiple video signals of different settings or combinations of supported spatial resolutions and/or bit rates, etc.

The two-stage system configuration effectively implements a full/reduced media processing pipeline, as opposed to the full media processing pipeline. The first part of the full media processing pipeline can be executed only once with the first stage of the two-stage system configuration or the full/reduced media processing pipeline, whereas the second part of the full media processing pipeline can be executed or instantiated multiple times with the multiple instances of the second stage of the two-stage system configuration or the full/reduced media processing pipeline.

Thus, in the two-stage system configuration, only a reduced pipeline—or the second stage that is reduced from the full media processing pipeline—is executed multiple times by (the multiple instances of) the second stage of the full/reduced media processing pipeline. Yet, each instance of the second stage of the full/reduced media processing pipeline can be combined with the first stage of the full/reduced media processing pipeline to provide functionality fully or completely equivalent to (an instance of) the full media processing pipeline with respect to the respective video signal in the multiple video signals. Additionally, optionally or alternatively, the multiple instances of the second stage may, but is not limited to, be run independently and/or in parallel in different processing threads of one or more computing processors or in multiple different computing processors.

As a result, redundant media processing and computational costs can be significantly reduced in the full/reduced media processing pipeline, as compared with deploying multiple instances of the full/reduced media processing pipeline, for supporting adaptive streaming with multiple spatial resolutions and/or multiple bit rates.

Adaptive streaming as described herein may be implemented with a variety of computing systems including but not limited to: any of: a single computing system, a combination of multiple computing systems, a geographically distributed computing system, one or more networks of computing systems, and so forth.

In some operational scenarios, the two-stage system configuration or the full/reduced media processing pipeline may be implemented by a cloud based computer cluster that comprises a plurality of cluster computer nodes each of which may be a virtual computer started through a cloud computing service. An input source video stream may be used to generate a plurality of consecutive (e.g., partly overlapping, etc.) input video segments. Each input video segment in the plurality of input video segments generated from the input source video stream may be assigned to a specific cluster computing node in the cloud computer cluster to produce corresponding coded bitstream portions or output video segments that support different settings or combinations of spatial resolutions and/or bit rates for adaptive streaming.

An adaptive streaming video signal that is being streamed to a recipient media streaming client may comprise a sequence of consecutive coded bitstream portions or consecutive output video segments. A coded bitstream portion or an output video segment—covering a time segment/interval in a plurality of time segments/intervals collectively representing an overall media program duration covered by the sequence of consecutive coded bitstream portions or consecutive output video segments—in the sequence of consecutive coded bitstream portions or consecutive output video segments may be specifically selected from different video signals of different settings or combinations of spatial resolutions and/or bit rates depending on real time or non-real-time streaming conditions/factors specific or general to the recipient media streaming client.

The video signal may be transmitted, streamed and/or delivered to the recipient media streaming client directly or indirectly. The noise embedded BL images decoded from the video signal may be rendered by the recipient media streaming client directly, for example if the noise embedded BL images match applicable display capabilities of the recipient media streaming client.

Additionally, optionally or alternatively, the video signal may further carry image metadata including but not limited to some or all of the backward reshaping mapping (or composer metadata), display management (DM) metadata, etc. The image metadata or the backward reshaping mapping received with the video signal or portions/segments therein, can be used by the recipient media streaming client to compose images of a higher dynamic range, a wider color gamut, a higher spatial resolution. etc., that match with applicable display capabilities of the recipient media streaming client. These composed (or reconstructed) images may be rendered by the recipient media streaming client instead of the BL images decoded from the video signal.

Example embodiments described herein relate to encoding video data. A forward reshaping mapping is generated to map a source image of a first dynamic range to a corresponding forward reshaped image of a second dynamic range lower than the first dynamic range. Noise is injected into an image of the first dynamic range and of a first spatial resolution to generate a noise injected image of the first dynamic range and the first spatial resolution. The image of the first dynamic range and the first spatial resolution is generated from spatially downsampling the source image of the first dynamic range. The forward reshaping mapping is applied to map the noise injected image of the first dynamic range and the first spatial resolution to generate a noise embedded image of the second dynamic range and the first spatial resolution. A video signal encoded with the noise embedded image of the second dynamic range and the first spatial resolution is delivered to a recipient device for the recipient device to render a display image generated from the noise embedded image.

Example embodiments described herein relate to decoding video data. A video signal generated by an upstream encoder and encoded with a noise embedded image of a second dynamic range and a first spatial resolution is received. The second dynamic range is lower than a first dynamic range. The noise embedded image of the second dynamic range and the first spatial resolution has been generated by the upstream encoder applying a forward reshaping mapping to a noise injected image of the first dynamic range and the first spatial resolution. The noise injected image of the first dynamic range and the first spatial resolution has been generated by the upstream encoder injecting noise into an image of the first dynamic range and of the first spatial resolution. The image of the first dynamic range and the first spatial resolution is generated from spatially downsampling a source image of the first dynamic range. A display image is generated from the noise embedded image of the second dynamic range and the first spatial resolution. The display image is rendered on an image display.

Example Video Delivery Processing Pipeline

FIG. 1 depicts an example process of a video delivery pipeline (100) showing various stages from video capture to video content display. A sequence of video frames (102) is captured or generated using image generation block (105). Video frames (102) may be digitally captured (e.g. by a digital camera, etc.) or generated by a computer (e.g. using computer animation, etc.) to provide video data (107). Additionally, optionally or alternatively, video frames (102) may be captured on film by a film camera. The film can be converted to a digital format to provide the video data (107). In a production phase (110), the video data (107) is edited to provide a video production stream (112).

The video data of the production stream (112) is then provided to a processor for post-production editing (115). The post-production editing (115) may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, manual and/or automatic scene cut information generation, image cropping, addition of computer-generated visual special effects, etc.) may be performed at the post-production editing (115) to generate a post-production version of HDR images and a content-mapped version of SDR images.

The post-production version of HDR images and the content-mapped version of SDR images depict the same set of visual scenes or semantic contents. The content-mapped version of SDR images may be derived from the post-production version of HDR images through content mapping and/or color grading performed manually, automatically or a combination of manual and automatic image processing operations. In some operational scenarios, during post-production editing (115), one or both of the post-production version of HDR images and the content-mapped version of SDR images are viewed and color graded, for example by colorists, on HDR and SDR reference displays that respectively support (e.g., direct, etc.) rendering HDR and SDR images.

By way of example but not limitation, HDR images (117-1) may represent the post-production version of HDR images, whereas SDR images (117) may represent the content-mapped version of SDR images. The coding block (120) receives the HDR images (117-1) and the SDR images (117) from the post-production editing (115), and forward reshapes the HDR images (117-1) into (forward) reshaped SDR images. The forward reshaped SDR images may closely approximate the SDR images (117) from automatic or manual content mapping (and/or color grading) operations.

The coding block (120) may implement some or all banding alleviation and adaptive streaming operations as described herein to generate multiple target versions of forward reshaped SDR images with banding alleviation for multiple different combinations of spatial resolutions and/or bitrates.

In some operational scenarios, each target version in some or all of the multiple target versions of forward reshaped SDR images with banding alleviation may be compressed/encoded by the coding block (120) into a coded bitstream (122) in a linear video coding mode. The coded bitstream (122) includes SDR images (e.g., forward reshaped banding-alleviated SDR images, etc.) in the target version. Additionally, optionally or alternatively, the coded bitstream (122) may include image metadata (e.g., backward reshaping metadata, etc.) comprising operational parameters to be used by a recipient device of the coded bitstream (122) to reconstruct HDR images from the forward reshaped banding-alleviated SDR images in the target version.

In some operational scenarios, each target version in some or all of the multiple target versions of forward reshaped SDR images with banding alleviation may be compressed/encoded by the coding block (120) into a sequence of consecutive video segments (122-1) in a segment video coding mode. Each video segment in a sequence of consecutive video segments (122-1) constituting a target version in some or all of the multiple target versions of forward reshaped SDR images with banding alleviation may be an independently accessible video streaming file (or a video streaming file set comprising a main video file and zero or more attendant files) that provides video content for a time sub-interval (e.g., 10 seconds, 20 seconds, etc.) in an entire time interval covered by the target version. Additionally, optionally or alternatively, the video segment may include image metadata (e.g. backward reshaping metadata, etc.) comprising operational parameters to be used by a recipient device of the video segment to reconstruct HDR images from the forward reshaped band-alleviated SDR images encoded in the video segment.

The coding block (120) may be implemented at least in part with audio and video encoders, such as those defined by ATSC, DVB, DVD, Blu-Ray, and other delivery formats, to generate some or all of the multiple target versions of forward reshaped SDR images with banding alleviation and encode each of some or all the multiple target versions of forward reshaped SDR images with banding alleviation into a respective coded bitstream (e.g., 122, etc.) and/or a respective sequence of consecutive video segments (e.g., 122-1, etc.).

In some operational scenarios, a coded bitstream (e.g., 122, etc.) or a sequence of video segments (e.g., 122-1, etc.) may represent a video signal (e.g., an 8-bit SDR video signal, a 10-bit SDR video signal, etc.) that is backward compatible with a wide variety of SDR display devices (e.g., SDR displays, etc.). In a non-limiting example, the video signal encoded with the forward reshaped banding-alleviated SDR images may be a single-layer backward compatible video signal. Here, a "single-layer backward compatible video signal" may refer to a video signal that carries SDR images that are optimized or color graded for SDR displays in a single signal layer. Example single layer video coding operations are described in U.S. Patent Application Publication No. 2019/0110054, "Encoding and decoding reversible production-quality single-layer video signals," by G-M. Su et al., the entire contents of which are hereby incorporated by reference as if fully set forth herein.

Some or all of the operational parameters in the image metadata provided with the forward-reshaped banding-alleviated SDR images encoded in the video signal may be decoded and used in image processing operations (e.g., prediction operations, backward reshaping operations, inverse tone mapping operations, etc.) by a recipient device of the video signal to generate reconstructed images of higher dynamic ranges than the dynamic range represented by the forward-reshaped banding-alleviated SDR images.

In some operational scenarios, the decoded images represent SDR images that were forward reshaped and banding-alleviated by an upstream video encoder (e.g., with the coding block (120), etc.) generated by forward reshaping (e.g., possibly spatially downsampled, etc.) post-production HDR images in the post-production version of HDR images (117-1) to approximate (e.g., possibly spatially downsampled, etc.) post-production SDR images in the content-mapped version of SDR images (117). The reconstructed images, as generated from the decoded images using the operational parameters in the image metadata transmitted in the video signal, represent HDR images approximating (e.g., possibly spatially downsampled, etc.) post-production HDR images in the post-production version of HDR images (117-1) on the encoder side.

Example reshaping operations are described in U.S. Pat. No. 10,080,026, "Signal reshaping approximation," by G-M. Su et al., the entire content of which is hereby incorporated by reference as if fully set forth herein.

Additionally, optionally, or alternatively, the video signal is encoded with additional image metadata including but not limited to display management (DM) metadata that can be used by the downstream decoders to perform display management operations on decoded images or backward reshaped images to generate display images optimized for rendering on target displays.

The video signal in the form of a coded bitstream (e.g., 122, etc.) or a sequence of video segments (e.g., 122-1, etc.) is then delivered downstream to receivers such as mobile devices, decoding and playback devices, media source devices, media streaming client devices, television sets (e.g., smart TVs, etc.), set-top boxes, movie theaters, and the like. In a receiver (or a downstream device), the video signal is decoded by decoding block (130) to generate decoded images 182, which may be the same as images (e.g., forward reshaped banding-alleviated SDR images, etc.) encoded by the coding block (120) into the video signal, subject to quantization errors generated in compression performed by the coding block (120) and decompression performed by the decoding block (130).

In operational scenarios in which the receiver operates with (or is attached or operatively linked to) a target display 140 that supports rendering the decoded images (182), the decoding block (130) can decode the images (182) from (e.g., the single layer in, etc.) the coded bitstream (122), and use the decoded images (182) (e.g., forward reshaped SDR images, etc.) directly or indirectly for rendering on the target display (140).

In some operational scenarios, the target display (140) is of similar characteristics as the SDR reference display (125), and the decoded images (182) are forward-reshaped banding-alleviated SDR images directly watchable on the target display (140).

In some embodiments, the receiver operates with (or is attached or operatively linked to) a target display that has different display capabilities from those of a reference display for which the decoded images (182) were optimized. Some or all of the operational parameters in the image metadata (or composer metadata) may be used to compose or reconstruct images from the decoded images (182) that are optimized for the target display.

For example, the receiver may operate with an HDR target display 140-1 that supports a higher dynamic range (e.g., 100 nits, 200 nits, 300 nits, 500 nits, 1,000 nits, 4,000 nits, 10,000 nits or more, etc.) than that of the decoded images (182). The receiver can extract the image metadata from (e.g., metadata container(s) in, etc.) the video signal, and use the operational parameters in the image metadata (or composer metadata) to compose or reconstruct images 132-1 from the decoded images (182) such as forward-reshaped banding-alleviated SDR images.

In some operational scenarios, the reconstructed images (132-1) represent reconstructed HDR images optimized for viewing on an HDR (e.g., reference, etc.) display that is the same as, or comparable with, an HDR target display operating in conjunction with the receiver. The receiver may directly use the reconstructed images (132-1) for rendering on the HDR target display.

In some operational scenarios, the reconstructed images (132-1) represent reconstructed HDR images optimized for viewing on an HDR (e.g., reference, etc.) display that is not the same as an HDR target display (140-1) operating in conjunction with the receiver. A display management block (e.g., 135-1, etc.)—which may be in the receiver, in the HDR target display (140-1), or in a separate device—further adjusts the reconstructed images (132-1) to characteristics of the HDR target display (140-1) by generating a display-mapped signal (137-1) adapted to the characteristics of the HDR target display (140-1). Display images or the adjusted reconstructed images may be rendered on the HDR target display (140-1).

Adaptive Video Streaming with Banding Alleviation

Techniques as described herein can be used to support adaptive streaming video images at multiple different combinations of spatial resolutions and bit rates, for example in a cloud computing environment. At the same time, relatively efficient false contouring (or banding) alleviation is implemented to mask false contouring or banding artifacts in the video images.

These techniques enable a media streamer to maintain a relatively high (e.g., the best possible, etc.) banding alleviation or masking capability with noise or film grain injection, and to reduce both computation costs and disk space usages for constructing a bit rate ladder with which the video images of the multiple different combinations of spatial resolutions and bit rates are generated.

Adaptive video streaming may be implemented to generate, encode and/or stream target video contents with different spatial resolutions and bit rates, adapting to time varying or dynamically changing network conditions/bandwidths and providing relatively smooth video playbacks of streamed video contents under these different network conditions/bandwidths.

A bit rate ladder can be implemented in a media streamer as described herein to generate some or all of the target video contents with different combinations of spatial resolutions and/or bit rates. The media streamer may, but is not limited to, be referred to as a media streaming server/service, a video streaming server/service, a media/video content provider, a media or video encoder, a media broadcast system, an upstream device, etc. In some operational scenarios, the media streamer may be deployed or accessed in a cloud computation environment. An adaptive streaming architecture as described herein can be implemented with relatively high efficiency and relatively low (e.g., cloud-based, etc.) computation resource usages, thereby significantly reducing ongoing operational costs in streaming media/video contents to the end user devices. Example computational resource usages may include, but are not necessarily limited to only, any usages relating to (e.g., cloud-based, etc.) CPU time, disk space, and so on.

In some operational scenarios, an individual full media processing pipeline may be deployed for each setting or combination of spatial resolution and/or bit rate in a bit rate ladder. This may be prone to incurring significant computation costs in terms of relatively high CPU usages, relatively high disk space usages, etc.

A media streamer as described herein implements multi-stage encoding such as a two-stage video encoding pipeline with which cost effective computation is performed to achieve improved video quality with banding alleviation video signals that support a bit rate ladder of multiple spatial resolutions and/or multiple bit rates. In some operational scenarios, the media streamer can be implemented with computing resources provided by or leased from a common or shared cloud-based system or service in cloud computing environments.

For the purpose of illustration only, a mezzanine video content item comprising input or source HDR images of a relatively high input dynamic range is received by the media streamer from an input HDR video source. The mezzanine video content item may, but is not limited to, be a TV program, a movie, a video recording of an event, etc. In some operational scenarios, the input HDR video source may be generated and provided to the media streamer by a system implementing or comprising a post-production block (115) in an end-to-end video delivery pipeline of FIG. 1. The media streamer—or a video coding system implementing or operating in conjunction with the media streamer—may implement a coding block (120) in the end-to-end video delivery pipeline of FIG. 1 to encode or generate multiple (e.g., a positive integer M greater than one (1), etc.) video signals such as coded bitstreams or sequences of output video segments at different combination of different spatial resolutions and/or different bit rates.

Video frames or images of the best possible quality supportable by (e.g., time varying, fluctuating, etc.) available network bandwidths/conditions may be selected by the media streamer from among some or all of the bitstreams or output video segments to be streamed in real time to end-user devices for (e.g., real time, near-real-time, etc.) playing back or image rendering.

A coded bitstream or output video segments as described herein may comprise a (e.g., 8-bit, image data, etc.) base layer encoded with forward reshaped (SDR) images of a relatively low dynamic range generated by the coding block (120) from forward reshaping—e.g., a spatially downsampled, film grain injected version of—the source HDR images.

In some operational scenarios, target banding (or false contour) alleviated video contents (e.g., target versions of SDR images, etc.) can be streamed from the media streamer to end user devices including but not limited to mobile devices with relatively small display screen size and/or relatively dim display screen operating with (e.g., only, etc.) 8-bit video decompression or decoding modules. Without implementing techniques as described herein, an 8-bit video system may not have sufficient image processing capabilities to avoid or ameliorate false contouring artifacts in image rendering operations.

In some operational scenarios, on the encoder-side, film grain noise can be injected at forward reshaping paths. In addition, inverse tone mapping curves can be adjusted at corresponding backward reshaping paths to reduce or alleviate banding artifacts. A relatively high computation costs may be incurred by these operations performed in both the forwarding and backward reshaping paths. Also, these operations may sacrifice highlight contrast ratios for the purpose of reducing banding artifacts. Thus, these operations may be relatively effective in operational scenarios in which large and bright display screens—rather than mobile devices of limited display capabilities—are used to render images. Even with large and bright display screens, in many instances, false contouring or banding artifacts may not be fully or completely removed under other approaches that do not implement techniques as described herein, due to high visibility of false contouring or banding artifacts on large display screen sizes and bright display screens.

Given that mobile devices have much smaller display screen sizes and dimmer image displays than typical non-mobile-device image displays such as TVs, the mobile devices tend to generate generally less false contouring or banding/compression artifacts in comparison with larger and brighter non-mobile-device image displays. Additionally, optionally or alternatively, the mobile devices tend to generate less attention to injected film grain noises as compared to that in non-mobile-device displays.

Techniques as described herein can be implemented to take advantage of these (e.g., unique, distinct, etc.) characteristics of mobile device display screens. Under these techniques, a relatively efficient and effective banding alleviation method can be implemented to simply modulate film grain strengths according to or covariant with slopes of (e.g., luminance, etc.) forward reshaping functions up to relatively strong film grain strengths.

To achieve relatively high quality banding masking or alleviation for image content coded in the (e.g., 8-bit, etc.) base layer, film grain parameters such as discrete cosine transform (DCT) block-size, DCT frequency, min/max noise strength, and so forth, may be tuned by the coding block (120) for different settings or combinations of spatial resolutions and bit rates in the bit rate ladder.

Full Media Processing Pipeline

Figure 2A:
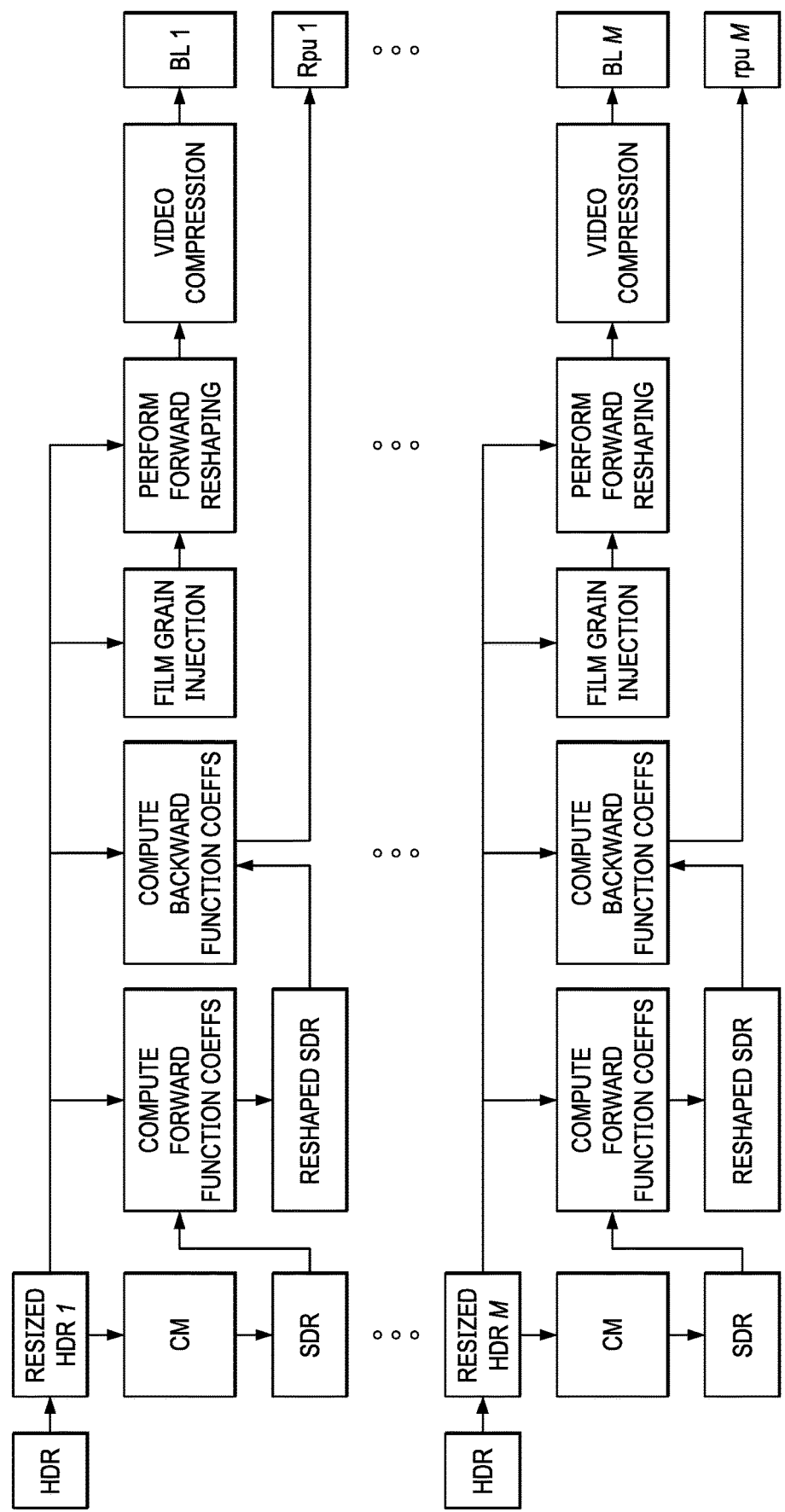
FIG. 2A through FIG. 2F illustrate example system configurations for adaptive video streaming.

FIG. 2A illustrates an example system configuration implementing a bit rate ladder for adaptive video content streaming with multiple instances of a full media processing pipeline. In this system configuration, to achieve relatively high performance for each setting or combination of spatial resolution and bit rate in the bit rate ladder, a full encoding instance is created per setting or combination. For example, M full encoding instances—or M instances of the full media processing pipeline—may be created for generating bitstreams or sequences of video segments for M settings or combinations of spatial resolution and bit rates in the bit rate ladder at the server side (e.g., the encoder side, the adaptive streaming service side, etc.).

Each of the M full encoding instances represents a full pipeline in which: an (e.g., each, etc.) input HDR image is spatially downsampled to generate a respective resized image (denoted as one of "HDR1," . . . "HDR M"); the resized HDR image is content-mapped (denoted as "CM") to generate a corresponding SDR image depicting the same visual semantic content as the HDR image but with a reduced dynamic range and a possibly reduced spatial resolution; the resized HDR image and the SDR image may be used to generate a forward reshaping mapping (denoted as "Compute forward function coeffs"); the forward reshaped mapping is used to forward reshaped the resized HDR image into a reshaped SDR image; the resized HDR image and the reshaped SDR image are used to generate a backward reshaping mapping, which may be provided as a part of image metadata (denoted as one of "Rpu 1," ... "Rpu M") to, and used by, a recipient device to backward reshape or reconstruct an HDR image approximating the resized HDR image; the resized HDR image is injected with noise (denoted as "Film grain injection"); the noise injected resized HDR image is forward reshaped (denoted as "Perform forward reshaping") to generate a noise embedded SDR image; the noise embedded SDR image is encoded (denoted as "Video compression") into a video signal or a sequence of output video segments in a BL image data layer (denoted as one of "BL 1," ... "BL M"); etc.

While this implementation of the bit rate ladder is possible to generate relatively high quality bitstreams or video segments, its computation efficiency may be relatively low since a coded bitstream or a sequence of video segments for each setting or combination in the bit rate ladder is generated by running a full separate encoder-side processing pipeline among multiple full separate encoder-side processing pipelines, as illustrated in FIG. 2A.

In this system configuration, image metadata such as backward reshaping metadata in each different setting or combination of spatial resolution and bit rate in the bit rate ladder is different and separately generated relative to other settings or combinations in the bit rate ladder, as forward reshaped SDR images in different settings or combinations have different spatial dimensions through spatial downsampling processes and have different injected film grains. Additionally, optionally or alternatively, in operational scenarios in which multi-stage video lossy compression/encoding is used to achieve relatively high video quality and expensive writing image data to the BL is to be avoided, each encoding instance may have to be run twice, thereby resulting in relatively high cost inefficiency.

Downsampling Following Full Media Processing Pipeline

Figure 2B:
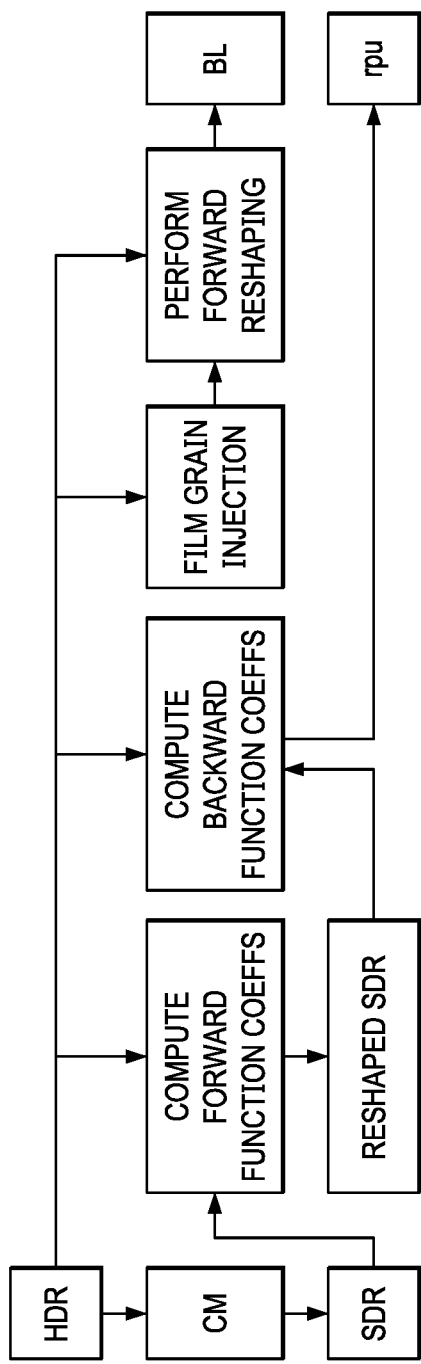
Figure 2C:
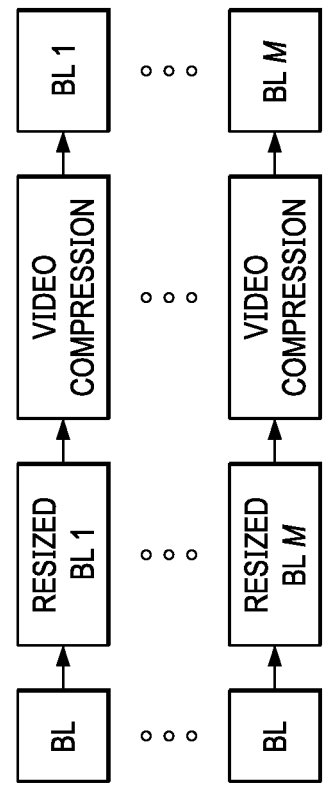

FIG. 2B and FIG. 2C illustrate an example two-stage system configuration implementing a bit rate ladder for adaptive video content streaming with downsampling following a full media processing pipeline. In this system configuration, to achieve relatively high computation efficiency, as illustrated in FIG. 2B, both the first stage and the second stage—constituting a full encoding processing pipeline—are performed for the highest spatial resolution—the same as or comparable to that of the source HDR images—to obtain uncompressed BL images (e.g., SDR images, etc.) of the highest spatial resolution and image metadata corresponding to the BL images.

In the full pipeline as illustrated in FIG. 2B, an (e.g., each, etc.) input HDR image is content-mapped (denoted as "CM") to generate a corresponding SDR image depicting the same visual semantic content as the HDR image but with a reduced dynamic range and a possibly reduced spatial resolution; the HDR image and the SDR image may be used to generate a forward reshaping mapping (denoted as "Compute forward function coeffs"); the forward reshaped mapping is used to forward reshaped the HDR image into a reshaped SDR image; the HDR image and the reshaped SDR image are used to generate a backward reshaping mapping, which may be provided as image metadata (denoted as "Rpu") to, and used by, a recipient device to backward reshape or reconstruct an HDR image approximating the HDR image; the HDR image is injected with noise (denoted as "Film grain injection"); the noise injected HDR image is forward reshaped (denoted as "Perform forward reshaping") to generate a noise embedded SDR image or an uncompressed BL image of the highest resolution; etc.

Then, at the second stage as illustrated in FIG. 2C, BL images of the highest spatial resolution are spatially downsampled to different spatial resolutions (denoted as "resized BL 1," ... "resized BL M") for each setting or combination of spatial resolution and bit rate in the bit rate ladder. The downsampled BL images of the different spatial resolutions are then compressed (denoted as "Video compression") or encoded into different video signals (denoted as "BL 1," ... "BL M") or different sequences of output video segments in accordance with a bit rate for the setting or combination.

Thus, in the system configuration as illustrated in FIG. 2B and FIG. 2C, for each combination of spatial resolution and bit rate other than the highest quality combination in the bit rate ladder, spatial downsampling and video compressing operations may be performed to obtain a corresponding bitstream or sequence of video segments. In this configuration or architecture, the image metadata generated from the full pipeline of FIG. 2B can be re-used in each spatially resized (or spatially downsampled) bitstream or sequence of video segments.

Even though saving a lot of computations, this system configuration may or may not allow optimizing film grain parameters for different spatial resolutions and bit rates since the film grain parameters are the same for all different spatial resolutions and bit rates. Since injected film grains injected in image content are downsampled along with the (host) image content during the spatial downsampling operations, mid-spatial-frequency film grains generated with the highest spatial resolution images may be low-pass filtered in these spatial downsampling operations. As a result, while this system configuration enables re-using the image metadata generated from the highest spatial resolution images in other settings or combinations of spatial resolutions and bit rates in the bit rate ladder, the sharpness of film grains degrades in the spatially downsampled images such that banding alleviation in these downsampled images may or may not be sufficiently effective.

This system configuration may also incur high usage of disk space as the BL images from the first stage as illustrated in FIG. 2B need to be written to the disk space so that each instance in multiple instances of the second stage as illustrated in FIG. 2C can receive the BL images as input for respective encoding operations such as spatial downsampling, video compression, etc. Alternatively, to avoid writing the BL images from the first stage as illustrated in FIG. 2B to disk space, operations in the first stage may be repeated. In effect, this system configuration or architecture as illustrated in FIG. 2B and FIG. 2C may become, or may degenerate into, the system configuration of FIG. 2A that comprises multiple full processing pipelines to generate multiple settings or combinations of spatial resolutions and bit rates in the bit rate ladder. This problem may exacerbate if multi-stage video compression is to be supported. The multi-stage video compression may be better performed with the BL images available in disk space rather than running the first stage repeatedly.

Full/Reduced Media Processing Pipeline

Figure 2D:
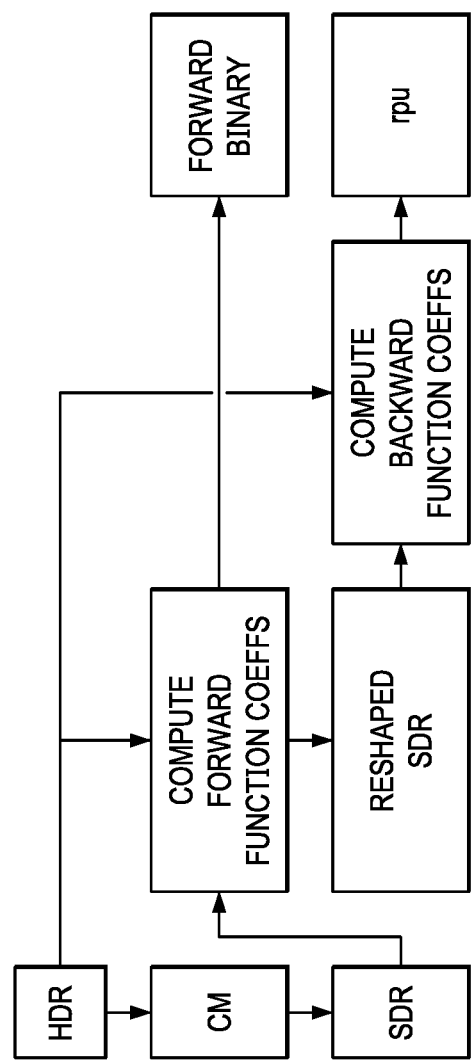
Figure 2E:
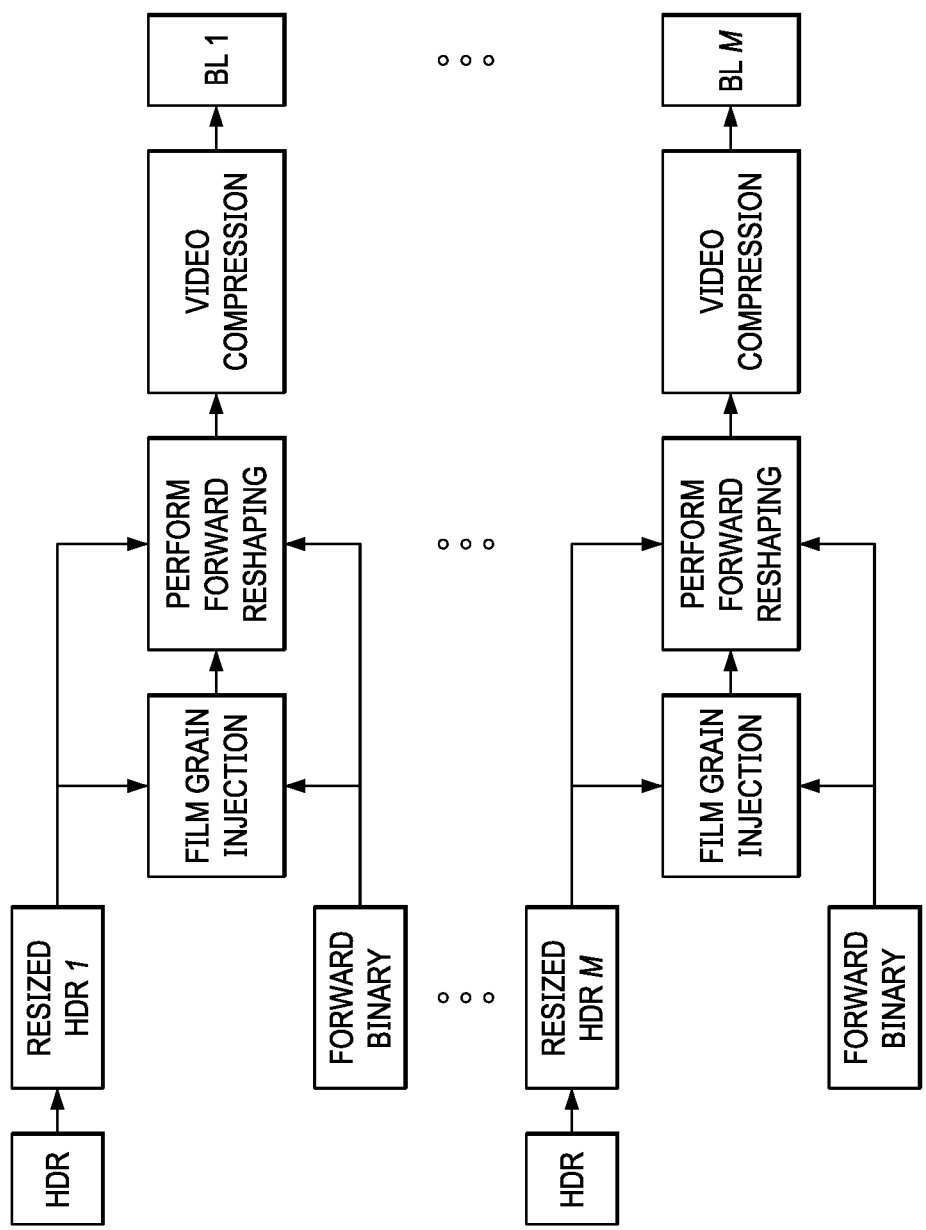

FIG. 2D and FIG. 2E illustrate an example system configuration or architecture with two-stage full and reduced pipeline with a single instance of a first stage and multiple instances of a second stage in a full/reduced media processing pipeline. This system configuration can be used to optimize film grain settings in each setting or combination of spatial resolution and bit rate in the bit rate ladder and to save computation costs and disk space at the same time.

In the first stage as illustrated in FIG. 2D, an (e.g., each, etc.) input HDR image is content-mapped (denoted as "CM") to generate a corresponding SDR image depicting the same visual semantic content as the HDR image but with a reduced dynamic range and a possibly reduced spatial resolution; the HDR image and the SDR image may be used to generate a forward reshaping mapping (denoted as "Compute forward function coeffs"); the forward reshaped mapping is used to forward reshaped the HDR image into a reshaped SDR image; the HDR image and the reshaped SDR image are used to generate a backward reshaping mapping, which may be provided as image metadata to, and used by, a recipient device to backward reshape or reconstruct an HDR image approximating the HDR image; etc.

In the first stage as illustrated in FIG. 2D, operational parameters or coefficients specifying forward reshaping (or forward reshaping functions) are computed, generated, and/or outputted to a binary file (denoted as "Forward binary" or FB). In addition, operational parameters or coefficients specifying backward reshaping (or backward reshaping functions) are computed, generated, and/or outputted as image metadata (denoted as "Rpu" or "rpu") to be coded or formatted into bitstream(s) or video segment(s) in accordance with a coding syntax specification.

In the first stage as illustrated in FIG. 2D, while the operational parameters for forward reshaping are computed or generated, forward reshaping based on these operational parameters need not be (e.g., actually, etc.) performed to obtain BL images for compression. Noise injection may be disabled at the first stage to avoid using noise-injected luma codewords to compute or generate the operational parameters for forward reshaping (or forward reshaping functions).

In each instance of the second stage as illustrated in FIG. 2E, input HDR images are resized to each (e.g., target, etc.) spatial resolution (denoted as one of "Resized HDR 1," ... "Resized HDR M") in different settings or combinations of spatial resolutions and/or bit rates supported with the bit rate ladder. With the operational parameters or coefficients for forward reshaping (or forward reshaping functions) generated or outputted from the first stage, film grain parameters can be adjusted and film grain noise can be injected (denoted as "Film grain injection") with the adjusted film grain parameters into the resized HDR images ("Resized HDR 1," ... "Resized HDR M") for each such spatial resolution in the bit rate ladder. A film grain parameter setting comprising a specific set of film grain parameters may be used to inject noise into an HDR image as described herein; the noise injected HDR image can be used to forward reshaped into an SDR or BL image to be encoded into a video signal supporting a specific spatial resolution and/or bit rate. Injection noise into the HDR image is separate and independent from applying the forward reshaping function to the HDR image to generate the reshaped SDR or BL image; in some operational scenarios, information derived from the forward reshaping function may be used to compute luminance-dependent noise strength. Additionally, optionally or alternatively, noise injection parameters may be selected or chosen separately for each spatial resolution and/or bit rate in the second stage.

In the second stage as illustrated in FIG. 2E, the forward reshaping—as specified by the operational parameters or coefficients computed or generated from the first stage as illustrated in FIG. 2D—can be performed (denoted as "Perform forward reshaping") on the noise injected resized HDR images to generate corresponding BL images for compression/encoding (denoted as "Video compression") into respective video signals (denoted as "BL 1," ... "BL M").

At the second stage as illustrated in FIG. 2E, there is no need to compute the operational parameters for forward and backward reshaping as these operational parameters are already generated at the first stage as illustrated in FIG. 2D. Therefore, at the second stage, there is no need to generate content mapped SDR images for the purpose of using them as reference SDR images to generate the operational parameters for forward and backward reshaping. Corresponding content mapping operations, which might be the most computation intensive part of video encoding, can be skipped in the second stage. As a result, the film grain parameters can be adjusted and applied optimally and relatively efficiently without incurring relatively high computational costs in the second stage, as illustrated in FIG. 2E.

The second stage as illustrated in FIG. 2E represents a reduced version of the full encoding pipeline such as illustrated in FIG. 2A. The system configuration or architecture as illustrated in FIG. 2D and FIG. 2E is well suited to implement a two-stage video compression pipeline. In operational scenarios in which bitstreams or video segments are encoded with multi-stage encoding, the reduced pipeline as illustrated in FIG. 2E can be run multiple times. The BL images generated in the second stage as illustrated in FIG. 2E need not to be written into disk space. Instead, these BL images (e.g., in the format of a BL YUV file, etc.) may be directly outputted or fed into input memory (e.g., random access memory, main memory, cache memory, etc.) of a subsequent video compression module that performs video compression of the BL images, thereby significantly reducing disk space costs in a cloud computing environment.

In some operational scenarios, at the first stage as illustrated in FIG. 2D, the operational parameters specifying forward reshaping (or forward reshaping functions)—as generated in the first stage of FIG. 2D—are outputted as, or written into, a forward binary file from the first stage of FIG. 2D to the second stage of FIG. 2E. The forward binary file may comprise downsampled luma or chroma reshaping data. For example, luma or chroma codewords of a higher bit depth in a FLUT that maps the luma or chroma codewords of the higher bit depth to luma or chroma codewords of a lower bit depth may be downsampled from the higher bit depth to an intermediate bit depth lower than the higher bit depth but higher than the lower bit depth to generate a downsampled FLUT that maps luma or chroma codewords of the intermediate bit depth to luma or chroma codewords of the lower bit depth. As a result, a smaller data size of FLUT may be generated and passed from the first stage to the second stage in a multi-stage encoding system configuration as described herein. Additionally, optionally, or alternatively, the forward binary file may contain luma or chroma reshaping data without downsampling. For example, reshaping data in a multivariate multiple regression (MMR) representation may not be downsampled.

Passing Forward Binary from Stage 1 to Stage 2 in Multi-Stage Encoding

For the purpose of illustration only, the forward binary file comprises a file header and per-frame (or per-image) forward reshaping information for multiple consecutive frames in a frame order.

The file header comprises a set of header parameters that can be used by the second stage to perform (e.g., correct, etc.) read operations, for example, with the per-frame forward reshaping information from the forward binary file.

In some operational scenarios, the set of header parameters include some or all of: (forward binary file) version information; number of frames/images for which forward reshaping information is provided in the forward binary file; HDR bit depth; SDR or BL bit depth; the total number of entries in a forward look-up table (forward LUT or FLUT) specifying per-frame luma forward reshaping; the highest order of MMR coefficients specifying per-frame chroma forward reshaping; etc.

The per-frame forward reshaping information comprises BOTH luma one-dimensional (1D) LUT (or FLUT) for forward reshaping HDR luma channel codewords (e.g., in 12-bit precision, etc.) into forward-reshaped SDR luma channel codewords (e.g., 8-bit precision, etc.) and MMR coefficients for mapping HDR luma and chroma codewords into codewords belonging to each forward-reshaped SDR chroma channel.

Given the HDR bit depth, the size of the per-frame forward reshaping information depends on the SDR or BL bit depth. For the 8-bit BL bit depth, the 1D-LUT (or FLUT) may use one byte per entry. Thus, the total number of entries in the 1D-LUT (or FLUT) is $2^{12}*1=4096$ bytes, for example for 12-bit precision video/image data.

Given the highest order of MMR coefficients as the 3rd order, the MMR coefficients in float precision (4 bytes) for generating forward reshaped chroma (Cb and Cr) channel codewords may use 2 (channel)*22 (MMR coefficients up to the 3rd order)*4 (bytes for float precision)=176 bytes.

Thus, the per-frame forward reshaping information for forward reshaping an HDR image into an SDR image consumes less than 5K bytes per frame, which is relatively small compared with image data (e.g., luma and chroma codewords for a given spatial resolution, etc.).

In some operational scenarios, source (or original) HDR images as described herein may be of a 16-bit HDR bit depth.

Let F(.) be an original 16-bit luma FLUT generated or predicted by the first stage as illustrated in FIG. 2D to forward reshape 16-bit HDR luma codewords to SDR luma codewords.

Let F'(.) be a subsampled luma FLUT to forward reshape subsampled (e.g., more quantized than the 16-bit HDR luma codewords, smaller bit depth than the 16-bit HDR bit depth, etc.) HDR luma codewords to SDR luma codewords. The total number of entries in F'(.)—or the size of the subsampled luma FLUT—is $N_F$, where $N_F$ represents the total number of downsampled or subsampled HDR luma codewords. In some operational scenarios in which the pre-subsampled HDR luma codewords is a codeword space of 16 bits, the total number of downsampled or subsampled HDR luma codewords in the downsampled/subsampled HDR luma codewords $N_F \leq 2^{16}$, such as 4096 (corresponding to a 12-bit downsampled HDR bit depth).

Let $\varepsilon$ be the step (or "stride"), $\varepsilon=2^{n_v}/N_F$. Now, the subsampled FLUT entry for each entry index u=0, 1, ... $N_F$–1 may be derived as follows:

$$F'(u) = F\left(u \cdot \varepsilon + \frac{\varepsilon}{2}\right) \quad (1)$$

where F'(u) represents a subsampled FLUT entry for an entry index of u;

$$F\left(u \cdot \varepsilon + \frac{\varepsilon}{2}\right)$$

represents an original FLUT entry for an entry index of $$u \cdot \varepsilon + \frac{\varepsilon}{2}.$$

By way of example but not limitation, given $N_F$=4096, the subsampled FLUT entry for an entry index u=2028 may be derived as follows: the subsampled FLUT entry corresponding to the original FLUT entry for an entry index $$u \cdot \varepsilon + \frac{\varepsilon}{2} = 2028 * 16 + 8 = 32456.$$

Thus, F'(2028)=F(32456). This subsampled FLUT (F'(.)) can be written to the forward binary file as luma forward reshaping information for an applicable or corresponding frame (e.g., with f as a frame index).

An example procedure for writing per-frame luma forward reshaping data for images/frames covered by the forward binary file is illustrated in TABLE 1 below.

TABLE 1

```
// Current frame index f
// full FLUT F(.)
// HDR bit depth: n_v , SDR bit depth: n_S
// Number of FLUT entries N_F
// stride: ε = 2^nv / N_F
u =0
if (n_S == 8){
    for (j = ε /2; j < 2^nv ; j += ε){
        luma_flut[f][u] = (uint8_t) F[j];
        u++;
    }
}
else {// if n_S> 8 e.g. 10
    for (j = ε /2; j < 2^nv ; j+= ε){
        luma_flut[f][u] = (uint16_t) F[j];
        u++;
    }
}
```

By way of example but not limitation, chroma forward reshaping—e.g., mapping HDR luma and chroma codewords to forward reshaped SDR chroma codewords—can be done using (a) MMR coefficients or (b) (e.g., single piece, etc.) polynomial, computed in the first stage of FIG. 2D. In various embodiments, each frame can be mapped with per-frame chroma forward reshaping data that comprises a (e.g., individual, different, etc.) number of MMR coefficients to generate forward-reshaped chroma (e.g., Cb and Cr channels, etc.) codewords for that frame.

In various operational scenarios, chroma reshaping data as described herein may be of variable or fixed sizes. Chroma reshaping data in an MMR representation may comprise MMR coefficients up to any given order. Chroma reshaping data in a polynomial representation may comprise zero values for some polynomial coefficients at certain polynomial positions.

In some operational scenarios, the size of per-frame chroma forward reshaping data written/read from a forward binary file may be kept the same for each frame. This allows a relatively large data size of chroma forward reshaping data (e.g., for multiple frames, etc.) to be written/read at once and to be correctly partitioned into multiple fixed chunk of per-frame chroma forward reshaping data relatively easily, thereby increasing data access/update speed and efficiencies that are especially useful in a cloud-based storage or computing environment.

To make per-frame chroma reshaping data size fixed or constant, a given (e.g., any, etc.) type of per-frame chroma reshaping data—whether (a) or (b) or another type—can be translated or transformed into fixed-order MMR coefficients (or MMR coefficients up to a maximum highest MMR order). For example, a global MMR order $A^{fix}$ can be specified for chroma forward reshaping data for all image/frames covered in the forward binary file in the header of the forward binary file. The global MMR order, which is the same for all the images/frames covered in the forward binary file, indicates how many MMR coefficients are to be signaled for each frame. This may mean, possibly for some frames/images of the images/frames covered in the forward binary file, one or more of the highest MMR order coefficients may be set to zero (0) in the forward binary file, if per-frame chroma forward reshaping data for these frames/images are of lesser highest MMR orders lower than the global MMR order indicated in the header of the forward binary file.

As previously mentioned, in some operational scenarios, per-frame chroma forward reshaping data is specified or defined using (a) MMR coefficients computed in the first stage of FIG. 2D. Denote the m-th C (either Cb or Cr; maybe alternatively denoted as c) channel MMR coefficients computed by the first stage of FIG. 2D as $M_m^C$ Denote the computed MMR order as $\lambda^C$.

An example procedure for writing per-frame chroma forward reshaping data—in the form of MMR coefficients—for images/frames covered by the forward binary file is illustrated in TABLE 2 below.

TABLE 2

// Current frame index f
// Stage 1 computed MMR coeffs: $M_m^C$ with MMR order $\lambda^C$.
// Cb channel: write coeffs
for (m = 0; m < (7* $\lambda^C$ + 1); m++ ){
  mmr_coeff[f][c][m]= $M_m^C$
}
// Cb channel: write 0's
for (m = (7* $\lambda^C$ + 1); m < (7* global_mmr_order +1); m++ ){
  mmr_coeff[f][c][m]=0.0f;
}

In some operational scenarios, per-frame chroma forward reshaping data is specified or defined using (b) (e.g., single piece or 1-piece $2^{nd}$ order, etc.) polynomial computed in the first stage of FIG. 2D. Here, polynomial coefficients for a polynomial as described herein can be placed in respective or corresponding MMR positions.

An MMR matrix comprising MMR coefficients can be formed using the i-th normalized HDR pixel values in luma channel Y and chroma channels Cb and Cr. The i-th normalized HDR pixel values include normalized HDR pixel values (e.g., between [0,1), etc.) in chroma channels Cb and Cr in a to-be-forward reshaped HDR image/frame. The normalized HDR pixel-values in the chroma channels Cb and Cr may be denoted as $\bar{v}_i^{Cb}$ and $\bar{v}_i^{Cr}$. The i-th normalized HDR pixel-values also include normalized HDR pixel values (e.g., normalized in the range [0,1), etc.) in the luma channel value at the i-th pixel in the HDR image downsampled after noise injection (if enabled). The normalized HDR pixel values in the luma channel Y may be denoted as $\bar{v}_i^{Y,d}$. In some operational scenarios, the luma downsampling may be performed to match the size of luma and chroma planes for an YUV 420 image—or the HDR image/frame in a 420 color space subsampling format.

The MMR vector, denoted as $V_i$, for the i-the chroma pixel may be specified or defined using the HDR pixel-values as follows:

$$[1\,\bar{v}_i^{Y,d}\bar{v}_i^{Cb}\bar{v}_i^{Cr}(\bar{v}_i^{Y,d}\bar{v}_i^{Cb})(\bar{v}_i^{Cb}\bar{v}_i^{Cr})(\bar{v}_i^{Y,d}\bar{v}_i^{Cb}\bar{v}_i^{Cr})(\bar{v}_i^{Y,d})^2 \\ (\bar{v}_i^{Cb})^2(\bar{v}_i^{Cr})^2 \ldots] \qquad (2)$$

where the k-th index entry is $V_i^k$, e.g. $V_i^0=1$.

A $2^{nd}$ order Cb polynomial may be specified or defined as follows:

$$\alpha_0^{Cb}+\alpha_1^{Cb}\bar{v}^{Cb}+\alpha_2^{Cb}(\bar{v}^{Cb})^2 \qquad (3)$$

The polynomial coefficients $\alpha^{Cb}$'s of the $2^{nd}$ order Cb polynomial in expression (3) above may be placed at their respective corresponding MMR positions or indexes: 0, 2, 9 in expression (2) above, with zero (0) as the starting position index in expression (2).

Likewise, polynomial coefficients $\alpha^{Cr}$'s of a $2^{nd}$ order Cr polynomial (not shown but similar to expression (3) above) may be placed at their respective corresponding MMR positions or indexes: 1, 3, 10 in expression (2) above.

Denote polynomial coefficients of a chroma channel c as $\alpha^C$. An example procedure for writing per-frame chroma forward reshaping data—in the form of polynomial coefficients stored in corresponding or translated MMR positions/indexes—for images/frames covered by the forward binary file is illustrated in TABLE 3 below.

TABLE 3

// Current frame index f
// Stage 1 computed chroma 2nd order polynomial coefficients: $\alpha^C$'s
// Reset all MMR coeffs to 0
for ( m = 0; m < 7* global_mmr_order +1; m++ ){
  mmr_coeff[f][c][m] = 0.0f;
}
// Set relevant coeffs
mmr_coeff[f][c][0] = $\alpha_0^C$;
if (c = "Cb") {
  mmr_coeff[f][c][2] = $\alpha_1^C$; // c or C denotes chroma channel Cb or Cr
  mmr_coeff[f][c][9] = $\alpha_2^C$;
}
else { // if c = "Cr"
  mmr_coeff[f][c][3] = $\alpha_1^C$;
  mmr_coeff[f][c][10] = $\alpha_2^C$;
}

In the second stage, the signaled forward reshaping data in the forward binary file can be used to forward reshape HDR image data and generate and encode corresponding BL or SDR image data with multiple spatial resolutions.

Noise Strength Adjustment

Noise such as film grain noise may be injected into an original or resized HDR image, such as an original HDR image, a source HDR image, an input HDR image, a resized HDR image, a spatially downsampled HDR image, and so forth, to prevent or reduce false contouring or banding artifacts in a rendered image that is directly or indirectly derived from the HDR image.

The injected noise for different original or resized HDR images can be randomly or non-repetitively selected among a plurality of film grain images in a noise image bank. For each (e.g., current, HDR, source HDR, etc.) frame into which noise is to be injected, a film grain image may be randomly or non-repetitively selected from among the plurality of film grain images in the noise image bank. In some operational scenarios, noise images such as film grain images may be indexed with respective index values. A non-repeating pseudo-random number generator may be used to generate index values that avoid repetitions in consecutively generated index values. As a result, two consecutive images are injected with two different noise images or film grain images. Additionally, optionally or alternatively, noise such as film grain (noise) in a selected noise or film grain image as described herein may be scaled, adjusted and/or modulated with luminance-dependent noise strengths, and then added to the luma channel of the original or resized HDR image, which may be represented as an HDR YUV image in some operational scenarios.

By way of example but not limitation, the HDR image has a bit depth $n_v=16$ with an available luminance codeword range of [0, 65535]. The noise (e.g., pattern, film grain, etc.) images in the noise image bank may comprise noise values normalized on the scale of [−1, 1].

In some operational scenarios, constant scaling (or a constant scaling factor) may be applied to noise values in a noise image. As a result, the noise strength is constant across different luminance sub-ranges or luma bins in the available luminance codeword range. On one hand, when the scaling factor used to scale the noise strength across these different luminance bins is relatively lower, many images or video clips may still likely show banding artifacts. On the other hand, when the scaling factor used to scale the noise strength across different luminance bins is increased or is relatively high, some regions or parts (especially highlight) of images or video clips may show excessive noise that can be visually perceptible and annoying to viewers.

In some operational scenarios, a (e.g., HDR-to-SDR, etc.) forward reshaping function—e.g., as represented by per-frame luma forward reshaping data in a forward binary file as described herein—may be used to compute a noise strength at each HDR codeword in the available luminance codeword range. The forward reshaping function can be used to control allocating codewords in various luma intensity sub-ranges or bins.

For example, in operational scenarios in which HDR luminance codeword sub-ranges or bins are mapped to relatively few SDR codewords, (e.g., average, etc.) distances between mapped SDR codewords for the (e.g., consecutive HDR codeword) sub-ranges or bins are relatively large or high. This can cause or lead to relatively large or high banding in an image (e.g., a reconstructed HDR image, etc.) constructed from backward reshaping a forward reshaped SDR or BL image in a received video signal. Thus, for those HDR codeword sub-ranges or bins, a relatively high noise strength can be applied to prevent, mask or reduce banding artifacts.

On the other hand, in operational scenarios in which HDR bins are mapped to relatively numerous SDR codewords, there may be less visual banding in those bins in a backward reshaped HDR image constructed from backward reshaping a forward reshaped SDR or BL image in a received video signal. For those luminance bins, a lower noise strength is sufficient to mask any false contouring or banding artifacts and at the time to prevent unnecessarily high annoying noise.

In these operational scenarios, the noise strength in an HDR luma sub-range or bin may be inversely related to the total number of mapped SDR codewords allocated for the HDR luma sub-range or bin.

In various embodiments, noise injection as described herein can be injected into original HDR images such as 16-bit source HDR images, 12-bit source HDR images, etc. Similarly, noise injection as described herein can be injected into downsampled HDR images such as 12-bit downsampled HDR images generated from downsampling—which is bit depth downsampling rather than spatial downsampling—16-bit original or source HDR images.

Noise Injection

FIG. 4A illustrates an example processing flow for injecting film grain noise into an n-bit HDR image. Let F(.) be a FLUT that maps $n_v$-bit (e.g., 16-bit, 12-bit, etc.) HDR luma codewords to $n_s$—bit (e.g., 8-bit, 10-bit, etc.) SDR codewords. Let v be an HDR codeword; thus F(v) becomes its mapped SDR codeword. Let the entire HDR range be partitioned into $N_B$ bins. The total number of HDR codewords in each HDR luminance bin $\pi=2^{n_v}/N_B$. Then, HDR luminance bin b contains HDR luminance codewords v=[(b*π),(b+1)*π)−1], where the bin index b=0, 1, 2, . . . , $N_B-1$.

Block 402 comprises finding a respective per-bin codeword increase in each HDR luminance (or luma) bin. The FLUT may be constructed as a monotonically non-decreasing function, or $F(v_2) \geq F(v_1)$ if $v_2 > v_1$. In some operational scenarios, each HDR luminance bin may be mapped to at least one SDR luminance codeword. The total number of additional SDR luminance codewords (in excess of 1) allocated for each HDR luminance bin (with a bin index b) may be denoted as $\phi_b$. In other words, $\phi_b$ indicates an amount of SDR codeword increase in the HDR luminance bin b.

In operational scenarios in which a 16-bit HDR image is mapped or forward reshaped to an 8-bit SDR image, the total number of SDR luminance codewords is 256. If the entire range of available 16-bit HDR luminance codewords is divided into 64 sub-ranges or bins, then each HDR luminance bin has 65536/64=1024 HDR codewords that are mapped or forward reshaped to a subset in the entire range (e.g., the total SDR luminance codeword range of 0-255 codewords, etc.) of available 8-bit SDR luminance codewords.

For example, the HDR luminance bin with the bin index b=5 contains v=[1024*5, (1024*6−1)] HDR luminance codewords. Assume this HDR luminance bin is mapped to SDR codeword F(v)=[30, 35]. Then, for the HDR luminance bin with the bin index b=5, the codeword increase $\phi_5=35-30=5$.

Block 404 comprises normalizing per-bin codeword increases for all HDR luminance bins. Let $\phi_{max}$ be the maximum per-bin codeword increase among all HDR luminance bins. The maximum per-bin codeword increase can be used to normalize all the per-bin codeword increases, for example on the scale of [0,1]. A per-bin normalized codeword increase $\bar{\phi}_b$, for the HDR luminance with the bin index b may be given as follows:

$$\bar{\phi}_b = \frac{\phi_b}{\phi_{max}} \quad (3)$$

Block 406 comprises assigning noise strengths according to the per-bin codeword increases in the HDR luminance bins.

Let $\psi_{min}$ be the minimum and $\psi_{max}$ be the maximum noise strength to be injected to the HDR image in the luminance channel. In various embodiments, these two noise strengths (or strength values) may set by a system as described herein automatically and/or may be specified as user input from designated users. The minimum and maximum noise strengths may be set to optimal values or selected values (e.g., the best values determined empirically or programmatically, etc.) that vary or are dependent on some or all of: spatial resolution, target bit rate, adopted video compression codec and corresponding parameters, and so on.

The per-bin normalized codeword increases can be used to obtain corresponding per-bin noise strengths between the configured minimum and maximum noise strengths $\psi_{min}$ and $\psi_{max}$, for the HDR luminance codeword bins. Let $\psi_v$ be the per-bin noise strength for an HDR luminance codeword v in an HDR luminance codeword bin. The bin index $b_v$ for the HDR luminance codeword bin may be computed as $$b_v = \left\lfloor \frac{v}{\pi} \right\rfloor,$$

where $\lfloor . \rfloor$ is the floor operation. The per-bin noise strength $\psi_v$—between [$\psi_{min}$, $\psi_{max}$]—for the HDR luminance codeword v may be computed with a scaling factor based on a normalized codeword increase $\bar{\phi}_{b_v}$ (e.g., $(1-\bar{\phi}_b)$, etc.) for the HDR luminance codeword bin with the bin index $b_v$, as follows:

$$\psi_v = \psi_{min} + (1-\bar{\phi}_{b_v}) \cdot (\psi_{max} - \psi_{min}) \quad (5)$$

Figure 3A:
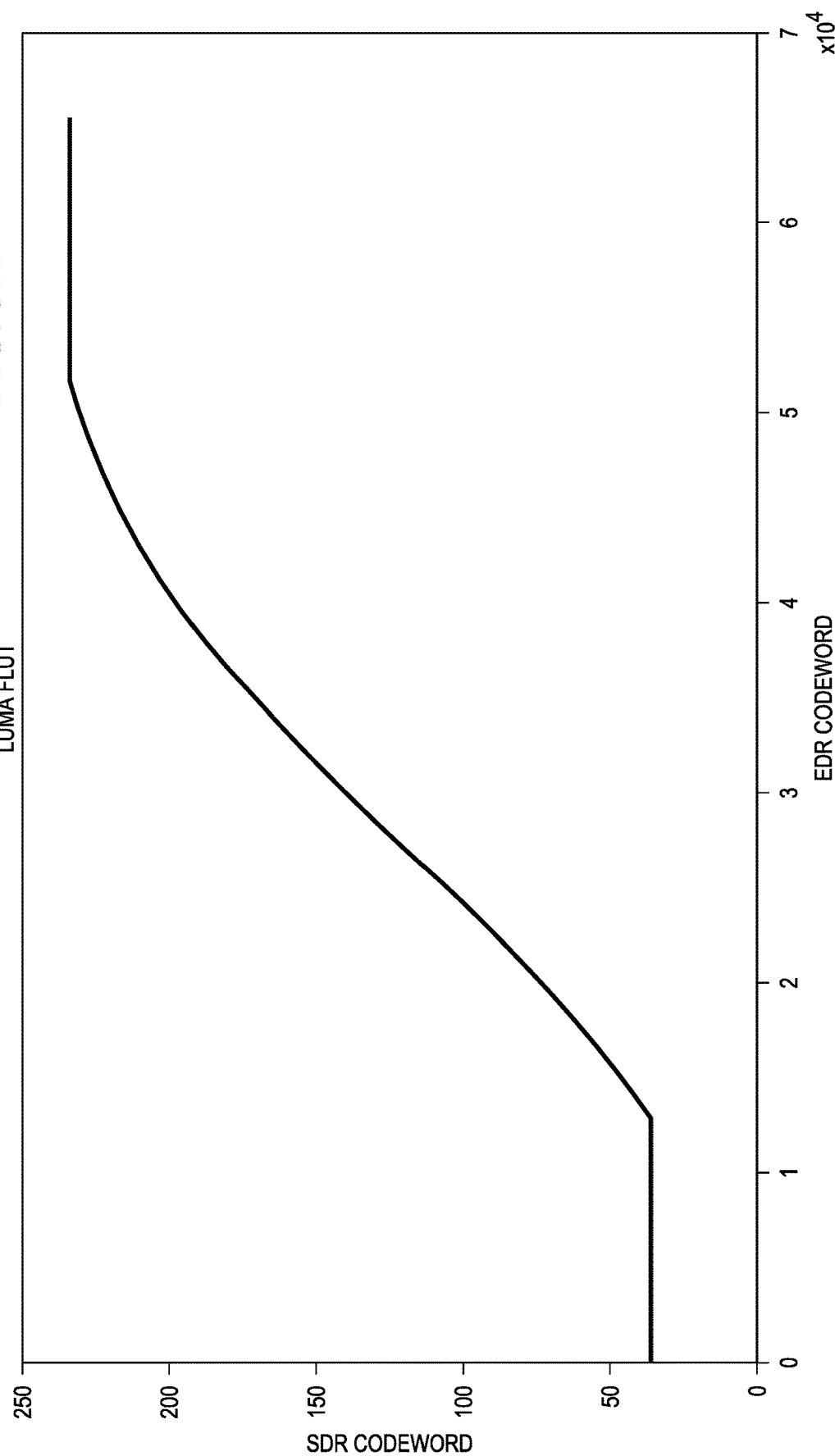
FIG. 3A illustrates an example luminance forward lookup table (FLUT)
Figure 3B:
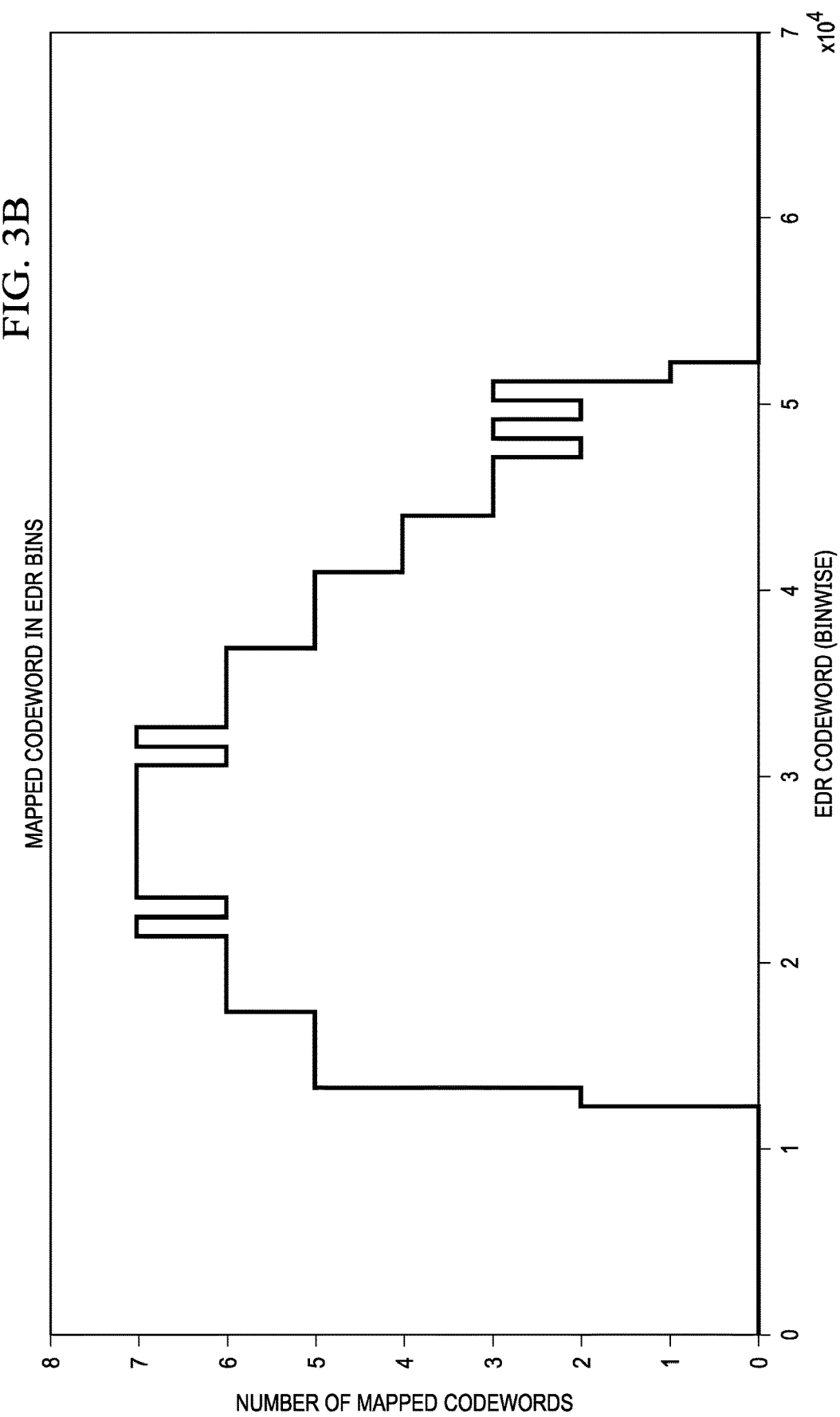
FIG. 3B illustrates example codeword increases in codeword bins determined from a FLUT.

FIG. 3A illustrates an example luminance FLUT. FIG. 3B illustrates example per-bin codeword increases determined from the FLUT.

An example procedure for computing per-bin noise strength for each HDR codeword based on the per-bin codeword increases determined from the FLUT is illustrated in TABLE 4 below.

TABLE 4

// Compute noise strength using FLUT
// Input: Luma FLUT F(.) , minimum and maximum noise strengths $\psi_{min}$ , $\psi_{max}$
// Number of bins: $N_B$ , EDR bit depth: $n_v$
// Number of EDR codewords per bin: $\pi = 2^{n_v} / N_B$
$\phi_{max} = 1.0$;
idx = 0;
// Compute $\phi_b$ : codeword increase per bin
for ( b = 0; b < $N_B$; b++ ){

TABLE 4-continued $\phi_b$ = F [(b + 1) * $\pi$) - 1] - F [b * $\pi$] ; // End of bin codeword– Start of bin codeword
  if ( $\phi_b$ > $\phi_{max}$ )
    $\phi_{max}$ = $\phi_b$ ;
  // Allocate SDR codewords per bin
  for ( v = idx; v < (idx + $\pi$); v ++ ){
    $\psi_v$ = $\phi_b$ ;
  }
  idx += $\pi$;
}
for (v = 0 ; v < $2^{n_v}$ ; v ++){
  // // Normalize and invert:

$$ns = 1 - \left(\frac{\psi_v}{\phi_{max}}\right);$$

// Get noise strength
  $\psi_v$ = $\psi_{min}$ + ns ( $\psi_{max}$ - $\psi_{min}$ );
}

The per-bin noise strengths computed using bin-wise measurements can be smoothened using an adaptive smoothing filter with a $\Theta$ number of codewords as kernel length. By way of example but not limitation, for 16-bit HDR luminance codewords, the kernel length $\Theta$ for the adaptive smoothing filter may be set to 2049.

Figure 3C:
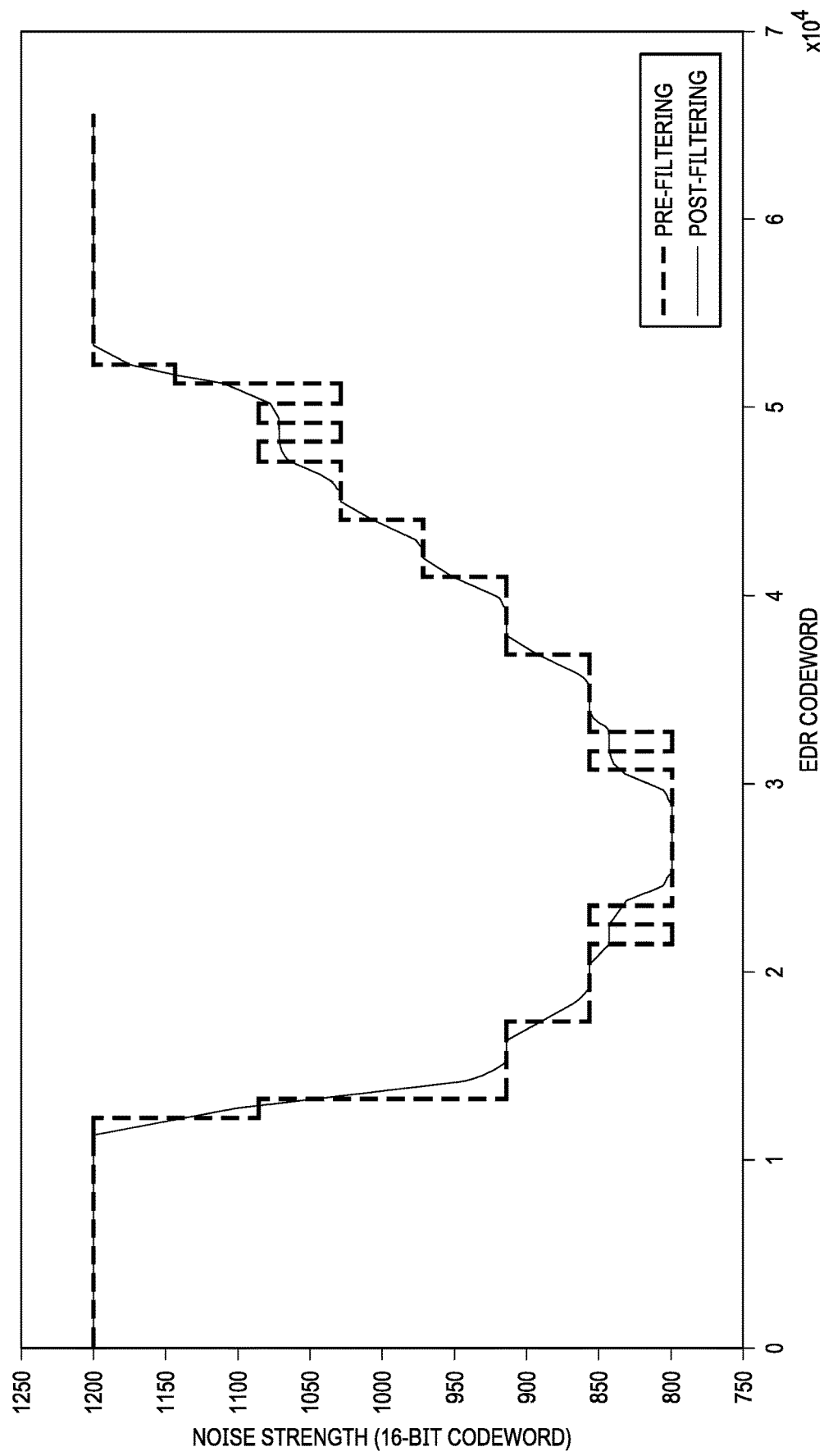
FIG. 3C illustrates example smoothened noise strengths.

Let $\bar{\psi}_v$ be the (per-codeword) filtered noise strength for the HDR luminance codeword v. FIG. 3C illustrates example (per-codeword) noise strengths generated by smoothing the per-bin noise strengths (e.g., in FIG. 3B, etc.). By way of example but not limitation, the configured minimum and maximum noise strengths [$\psi_{min}$, $\psi_{max}$]=[800, 1200]. The pre-filtering curve represents per-bin noise strength computed using expression (5). The post-filtering curve represents per-codeword noise strength $\bar{\psi}_v$, generated by applying smooth filtering to the per-bin noise strengths. The X-axis in FIG. 3C represents the entire HDR luminance codeword range 0-65535, which is processed or partitioned into 64 bins.

An example procedure for computing the (per-codeword) noise strength for each HDR codeword based on smooth filtering is illustrated in TABLE 5 below.

TABLE 5

// Kernel length: $\Theta$ = (2048 / $2^{(16 - n_v)}$ )+ 1      e.g. for $n_v$ =16, $\Theta$ = 2049
// Half Kernel length $\Theta_H$ = floor ($\Theta/2$), where floor is flooring operation to the largest
// integer smaller than $\Theta/2$
// Temporary space to store cumulative sum: tmp[ ] = 0;
// First filtering pass: Non-decreasing filtering
tmp [0] = $\psi_0$
for (v = 0 ; v < $2^{n_v}$ ; v ++){
  tmp [v] = tmp [v–1] + $\psi_v$ ;
}
for (v = 0 ; v < $2^{n_v}$ ; v ++){
  // odd and even filter lengths have different start points
  if ($\Theta$ is even)
    $v_{min}$ = max (v – $\Theta_H$, 0) ;
  else
    $v_{min}$ = max (v – $\Theta_H$ – 1, 0);
  $V_{max}$ = min (v + $O_H$, $2^{n_v}$ – 1 );
  if ($v_{max}$ > $v_{min}$ )
    result = (tmp[$v_{max}$] – tmp [$v_{min}$]) / ($v_{max}$ – $v_{min}$);
  else
    result = 0;
  // conditional filtering: maximum of the filtered and original signal
  if (result > $\psi_v$ )
    $\psi_v$ = result;
}
// Second filtering pass: Regular filtering
tmp [0] = $\psi_0$
for (v = 0 ; v < $2^{n_v}$ ; v++){

TABLE 5-continued

```
    tmp [v] = tmp [v−1] + ψ_v .;
}
for (v = 0 ; v < 2^{n_v} ; v ++){
    // odd and even filter lengths have different start points
    if (Θ is even)
        v_{min} = max (v − Θ_H, 0) ;
    else
        v_{min} = max (i − Θ_H − 1, 0);
    v_{max} = min (i + Θ_H, 2^{n_v} − 1 );
    if (v_{max} > v_{min} )
        result = (tmp[v_{max}] − tmp [v_{min}]) / (v_{max} − v_{min});
    else
        result = 0;
    ψ̄_v = result;
}
```

Varying Noise Strength with Luminance Levels

Techniques for computing noise strengths can be applied to both original images as well as downsampled (e.g., bit depth downsampled, spatially downsampled, etc.) images.

These techniques may be applied in the second stage such as illustrated in FIG. 2E to determine per-codeword noise strength for each HDR luminance codeword, which may be in either an original HDR image or a downsampled HDR image obtained from (e.g., bit depth, spatially, etc.) downsampling a (e.g., higher bit depth, higher spatial resolution, etc.) source HDR image By way of example but not limitation, noise strength computation may be performed for a downsampled HDR image of a bit depth of 12 bits. A luminance FLUT for the downsampled HDR image contains an entire luminance codeword range of only 4096 entries, which is less than 65536 entries for an (e.g., original, source, etc.) HDR image of a bit depth of 16 bits. In some operational scenarios, the luminance FLUT F'(.) for the downsampled HDR image may be obtained by subsampling an original 65536-entry FLUT F(.) for the (e.g., original, source, etc.) HDR image of a bit depth of 16 bits, as illustrated in expression (1).

Here, a forward reshaped SDR or BL luminance codeword—to which an HDR luminance codeword v in the 16-bit (e.g., original, source, etc.) HDR image is mapped—may be specified or defined by a (look up forward mapping) entry F'(floor(v/ε)) in the subsampled FLUT F'(.), where floor(v/ε) represents an entry index in the subsampled FLUT F'(.); ε represents a "stride" with $\varepsilon = 2^{n_v}/N_F$; and floor(.) represents the flooring operation that discards the fractional part of the argument and keeps only integer part (or number) of the argument.

In an example, $2^{n_v} = 65536$; $N_F = 4096$; $\varepsilon = 65536/4096 = 16$. To look up a forward mapping (or a forward reshaped SDR or BL luminance codeword) for a 16-bit HDR luminance codeword v=32449, an entry index in the subsampled FLUT F' is computed as follows: floor(v/ε))=floor(32456/16) =2028.

An example procedure for determining per-bin noise strengths based on per-bin codeword increases in the subsampled FLUT F' and for determining per-codeword noise strength based on applying smooth filtering to the per-bin noise strengths is illustrated in TABLE 6 below.

TABLE 6

```
// Compute noise strength using subsampled FLUT
// Input: Luma FLUT F'(.) , minimum and maximum noise strengths
ψ_{min} , ψ_{max}
// Number of bins: N_B , EDR bit depth: n_v
// Number of EDR codewords per bin: π = 2^{n_v} / N_B
```

TABLE 6-continued

```
// stride: ε = 2^{n_v} / N_F
φ_{max} = 1.0;
idx = 0;
// Compute φ_b : codeword increase per bin
for (b = 0; b < N_B; b++ ){
    φ_b = F' [floor( (b + 1) * π − 1) / ε)] − F' [floor( (b * π) / ε)] ;
    if ( φ_b > φ_{max} )
        φ_{max} = φ_b ;
    // Allocate SDR codewords per bin
    for ( v = idx; v < (idx + π); v ++ ){
        ψ_v = φ_b ;
    }
    idx += π;
}
for (v = 0 ; v < 2^{n_v} ; v ++){
    // // Normalize and invert
    ns = 1 − ( ψ_v / φ_{max} ) ;
    // Get noise strength
    ψ_v = ψ_{min} + ns ( ψ_{max} − ψ_{min} );
}
```

In some operational scenarios, the same process flow as illustrated in FIG. 4A may be applied in the second stage of FIG. 2E to inject noise such as film grain noise into resized (or spatially downsampled) HDR images for each spatial resolution supported by a bit rate ladder as described herein, using the per-codeword noise strengths computed with the subsampled FLUT F'—which may be passed in from the first stage of FIG. 2D to the second stage of FIG. 2E in the forward binary file—instead of the original FLUT F.

The noise-injected resized HDR images may be forward reshaped by forward reshaping operations based on the luma and chroma forward reshaping data in the forward binary file (e.g., comprising the luma FLUT and chroma MMR coefficients up to a fixed highest order, etc.) to generate corresponding forward reshaped SDR or BL images depicting the same visual semantic content as the HDR images.

Denote the HDR luminance codeword of the i-th pixel in a noise-injected resized HDR image as $\tilde{v}_i^Y$. An example procedure for computing a corresponding $n_s$-bit forward reshaped SDR or BL luminance codeword $\bar{s}_i^Y$ of the i-th pixel in a corresponding noise-injected forward reshaped SDR or BL image—for the HDR luminance codeword of the i-th pixel is illustrated in TABLE 7 below.

TABLE 7

```
// Image luma width W, height H
// FLUT data from binary file F'(.)
// stride: ε = 2^{n_v} / N_F
// stride bit shift: ε^b = log2(ε)
```

TABLE 7-continued

```
for (i = 0; i < W * H; i++) {
    $\bar{s}_i^Y$ = clip3(F'($\tilde{v}_i^Y$ >> $\varepsilon^b$) , 0, $2^{n_v}$ – 1);
}
```

Denote the HDR chrominance (Cb/Cr) codeword of the i-th pixel in a noise-injected resized HDR image as $\bar{s}_i^{Cb}, \bar{s}_i^{Cr}$. As indicated previously, fixed order MMR coefficients signaled in the forward binary file may be used to map HDR luminance and chrominance codewords to forward reshaped SDR or BL chrominance codewords for Cb and Cr channels. An example procedure for computing corresponding forward reshaped SDR or BL chrominance codewords $\bar{s}_i^{Cb}, \bar{s}_i^{Cr}$ of the i-th pixel in the corresponding noise-injected forward reshaped SDR or BL image—is illustrated in TABLE 8 below.

TABLE 8

```
// Image luma width W, height H
// Chroma MMR data from binary file $M_m^C$'s
// Set maxval = ($2^{n_v}$ –1) / $2^{n_v}$
for (i= 0; i < (W * H)/4; i++) {
    $\bar{s}_i^{Cb}$ = 0;
    $\bar{s}_i^{Cr}$ = 0;
}
for (i = 0; i < (W * H)/4; i++) {
    for (m = 0; m < 7* $N^{fix}$ +1; m++){
        $\bar{s}_i^{Cb}$ += $V_i^m$ * $M_m^{Cb}$
        $\bar{s}_i^{Cr}$ += $V_i^m$ * $M_m^{Cr}$
    }
    $\bar{s}_i^{Cb}$ = clip3($\bar{s}_i^{Cb}$ , 0.0, maxval);
    $\bar{s}_i^{Cr}$ = clip3($\bar{s}_i^{Cr}$ , 0.0, maxval);
}
```

Cascaded Full and Reduced Pipeline Architecture for Live Encoding

Figure 2F:
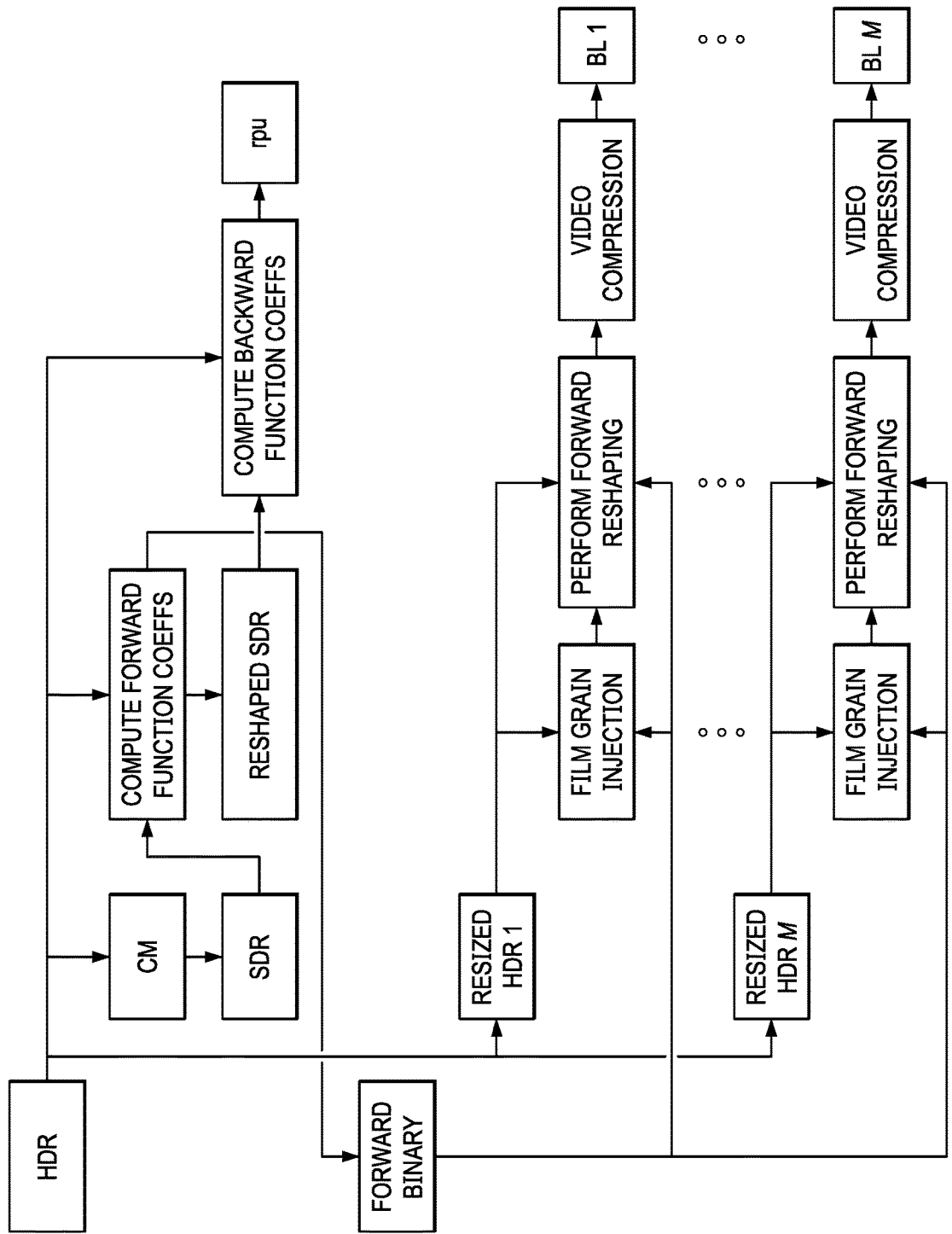

The two-stage full/reduced processing pipeline as illustrated in FIG. 2D and FIG. 2E can be cascaded together in a single (combined) stage as illustrated in FIG. 2F. This single stage of FIG. 2F may, but is not necessarily limited to only, be used to encode bitstreams and/or video clips in live streaming/broadcast scenarios. In the single stage of FIG. 2F, the output of the full pipeline portion (or the first stage) as illustrated in FIG. 2D, such as forward binary (forward binary file(s)), can be directly fed into the input of the reduced pipeline portion (or the second stage) of FIG. 2E to reduce processing time delay. In addition, the single stage of FIG. 2F can incorporate multiple instances of the reduced pipeline portion (or the second stage) of FIG. 2E so different combinations of spatial resolutions and bit rates in a supported bit rate ladder can be encoded concurrently or simultaneously.

Segment Encoding for Cloud Computing

The full/reduced pipeline as illustrated in FIG. 2D and FIG. 2E can be cascaded together as a single stage as illustrated in FIG. 2F to generate corresponding output bitstream portions (or output video segments) at different settings or combinations of spatial resolutions and bit rates in the bit rate ladder for each input video segment of a media program represented in an input or source HDR video signal comprising input or source HDR images. The corresponding output bitstream portions (or output video segments) and the input video segment depict the same visual semantic content, but at different combinations of spatial resolutions and bit rates.

In some operational scenarios, a media streaming server/service implementing the full/reduced stages of FIG. 2D and FIG. 2E or the single combined stage of FIG. 2F dynamically or adaptively stream the generated output video segments to different recipient playback devices with different network conditions/bitrates and/or different display capabilities (e.g., in terms of spatial resolutions and/or dynamic ranges and/or color gamuts supported by the recipient playback devices, etc.).

In some operational scenarios, a media streaming server implementing the full/reduced stages of FIG. 2D and FIG. 2E or the single combined stage of FIG. 2F dynamically or adaptively switch to a specific output bitstream portion (or output video segment) of the generated output video segments based on real time network conditions and/or system resource usages in connection with the media streaming server/service and a recipient playback device. The specific output bitstream portion (or output video segment) to be streamed from the media streaming server/service to the recipient playback device may be selected, from among the (multiple) corresponding output bitstream portions (or output video segments), as a bitstream (or video segment) of the best supported visual quality under the real time network conditions and/or system resource usages.

The media streaming server can be implemented in cloud-based media streaming scenarios with a cloud computing cluster that comprises a plurality of computer nodes (e.g., virtual computers, computer instances started with a cloud computing service, etc.). An individual computer node in the cluster may be assigned to process a respective input video segments in a plurality of input video segments generated from an input or source HDR video signal to generate or encode (multiple) output bitstream portions (or output video segments) from the respective input video segment.

Figure 2G:
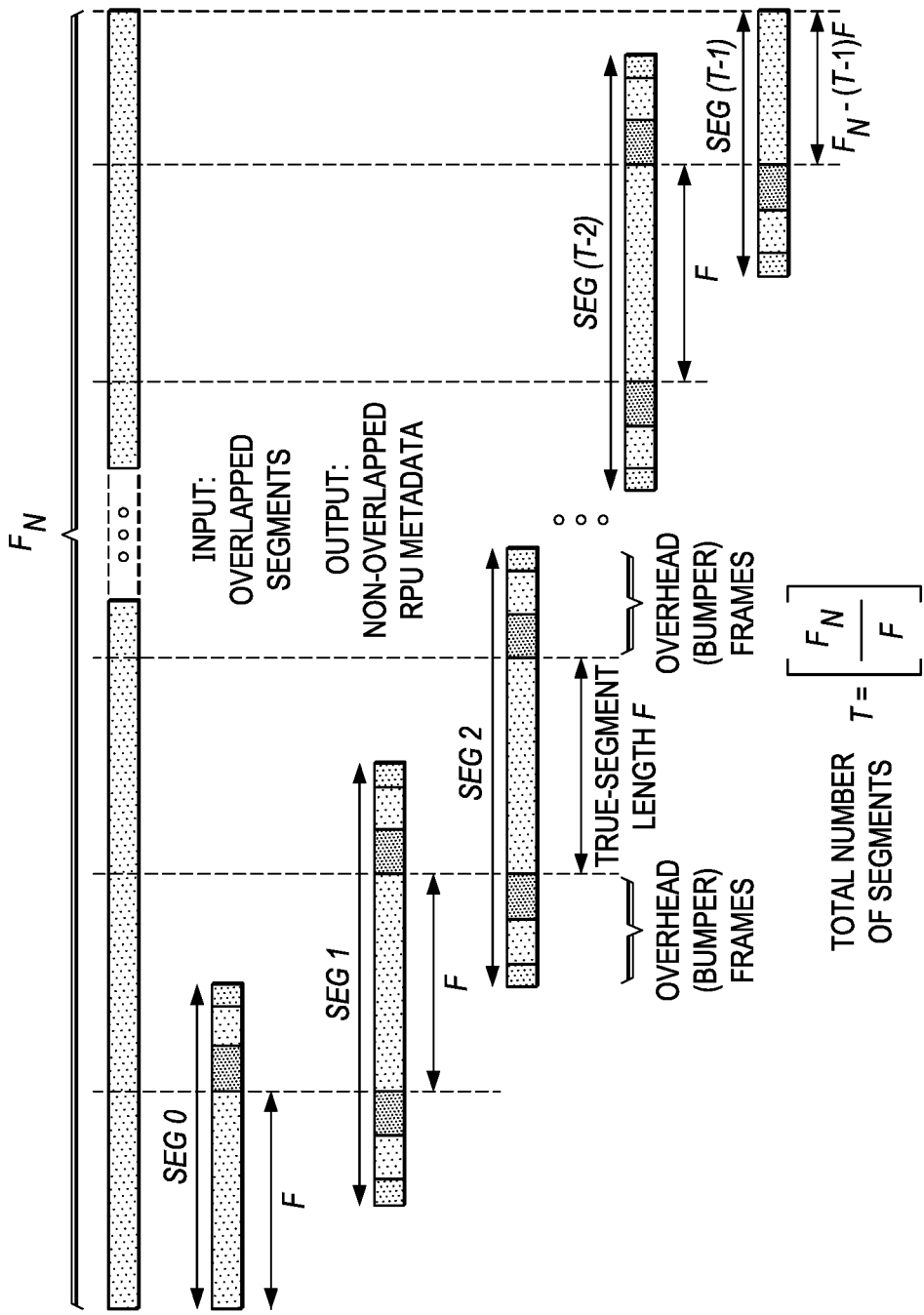
FIG. 2G illustrates an example generation of input video segments from an input video signal.

FIG. 2G illustrates an example generation of a plurality of input video segments from a sequence of consecutive input or source HDR images in an input HDR video signal. An input video segment in the plurality of input video segments may be processed and encoded by a cluster node in a (e.g., cloud-based, etc.) computer cluster into corresponding output bitstream portions or output video segments in output SLBC video signal(s) for different settings or combinations of spatial resolutions and bit rates.

As illustrated in FIG. 2G, the entire media program (or video clip) represented by the sequence of consecutive input or source HDR images may comprise a total number of $F_N$ consecutive images/frames. The $F_N$ consecutive images/frames in the media program (or video clip) may be divided into a plurality of true segments. As used herein, the term "true segments" refers to subsets (or frame-chunks)—of consecutive input or source HDR images in the media program (or video clip—that are non-overlapping with one another and comprise mutually exclusive portions (or subsequences) of the (overall) sequence of consecutive input or source HDR images. By way of example but not limitation, each true segment in the plurality of true segments partitioned from the sequence of consecutive input or source HDR images of the media program (or video clip) comprises F images/frames.

An input video segment as described herein may be generated or composed from a corresponding true segment by adding one or two adjacent portions of overhead (bumper) frames to the corresponding true segment. The one or more adjacent portions of overhead (bumper) frames extend to, or (partly) overlap with, one or more adjacent true segments that are adjacent to the corresponding true segment.

More specifically, the first (or starting) input video segment (denoted as "Seg 0" in FIG. 2G with successive input video segments denoted as "Seg 1," . . . "Seg 2," . . . "Seg (T-2)," and "Seg (T-1)")—which is an edge input video segment—may be generated from the first (or starting) true segment by adding a trailing adjacent portion of overhead (bumper) frames. The trailing adjacent portion of overhead (bumper) frames added in the first input video segment extends to, or (partly) overlaps with, the second true segment immediately following the first true segment.

The second input video segment ("Seg 1" in FIG. 2G)—which is an interior input video segment—may be generated from the second true segment by adding a leading adjacent portion and a trailing adjacent portion of overhead (bumper) frames. The leading and trailing adjacent portions added in the second input video segment respectively extend to, or (partly) overlap with, the first true segment immediately preceding the second true segment and the third true segment immediately following the second true segment.

The last (or ending) input video segment (denoted as "Seg (T-1)" in FIG. 2G)—which is an edge input video segment—may be generated from the last (or ending) true segment by adding a leading adjacent portion of overhead (bumper) frames. The leading adjacent portion of overhead (bumper) frames added in the last input video segment extends to, or (partly) overlaps with, the second last true segment ("Seg (T-2)") immediately preceding the last true segment.

Thus, a total number T of input video segments, where $T=F_N/F$, may be generated from the media program (or video clip). Each of the input video segments may be distributed, processed or encoded by a cluster node in a (e.g. cloud-based, etc.) computer cluster into corresponding output bitstream portions or output video segments for different combinations of spatial resolutions and bit rates.

Figure 2H:
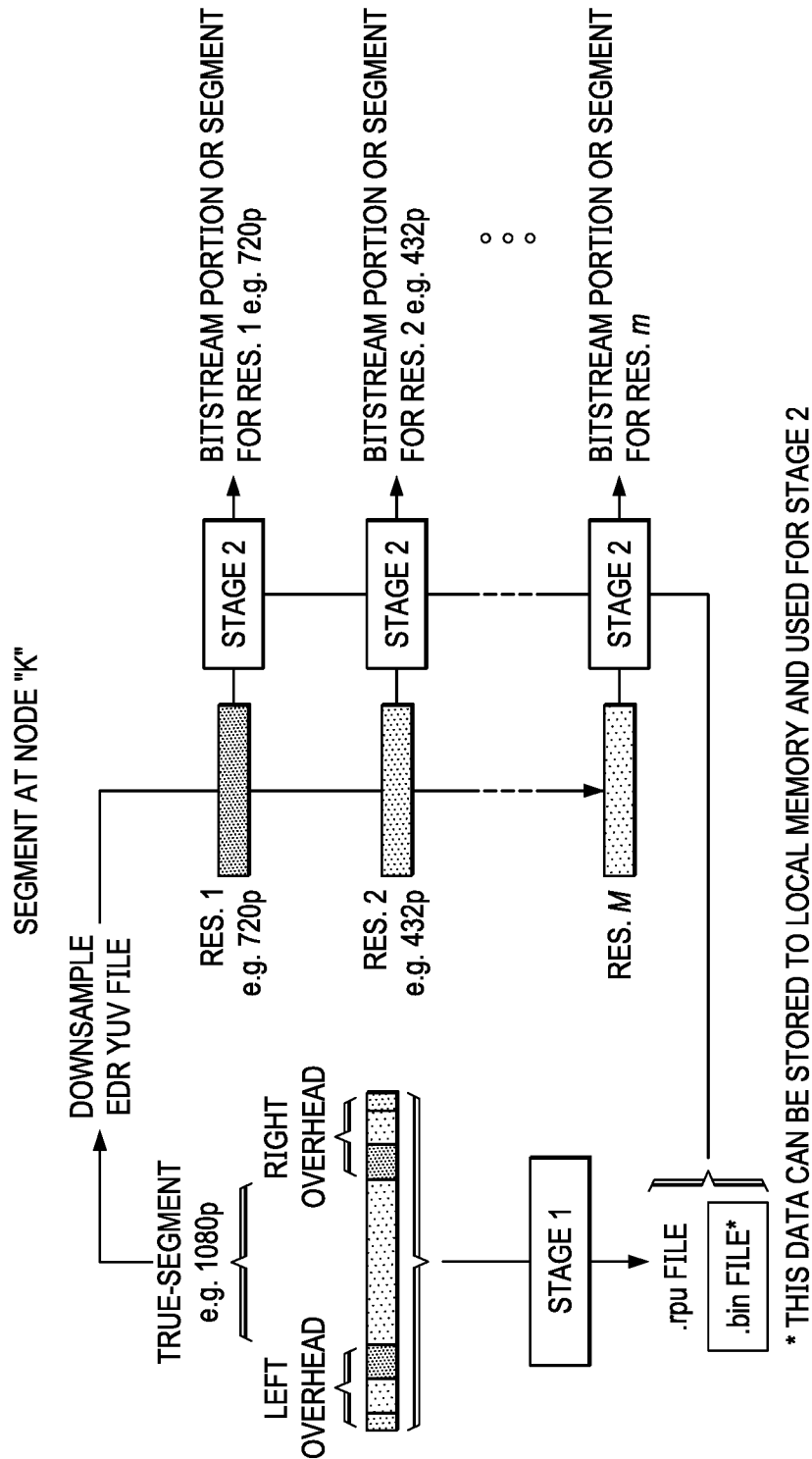
FIG. 2H illustrates an example system configuration or architecture implemented by a cluster node.

FIG. 2H illustrates an example system configuration or architecture implemented by a cluster node (e.g., a cloud-based virtual computer, etc.) denoted as "Node K" for processing an input video segment as described herein. By way of example but not limitation, two stages such as illustrated in FIG. 2D and FIG. 2E may be used or implemented by the cluster node for processing the video segment. Additionally, optionally or alternatively, these two stages as illustrated in FIG. 2H may be combined into a single stage such as illustrated in FIG. 2F.

In the first stage (denoted as "Stage 1"), the input video segment assigned to the cluster node can be processed at the highest spatial resolution, which may be the same as the native spatial resolution of input or source HDR images in the input video segment, to generate or produce a forward binary file (denoted as ".bin file") and image metadata (denoted as ".rpu file") such as backward reshaping metadata.

In the second stage (denoted as "Stage 2"), each input or source HDR image (e.g., an HDR YUV image, etc.) is downsampled to obtain multiple (e.g., M where M is an integer greater than one (1), etc.) downsampled HDR images of various spatial resolutions supported by a bit rate ladder as described herein. These spatial resolutions are indicated Res 1 (e.g., 720p, etc.), Res 2 (e.g., 432p, etc.), to Res M.

These downsampled HDR images of different spatial resolutions may be processed in the second stage using luminance and chrominance forward mapping data in the forward binary file generated in the first stage and/or the image metadata ("rpu"), into respective output bitstream portions or respective output video segments of different spatial resolutions. The same RPU and forward binary file can be used in the second stage for the different resolutions. In some operational scenarios, multiple threads and/or multiple processes may be used to generate the output bitstream portions or output video segments in parallel and/or independently, given the same RPU and forward binary file.

In some operational scenarios, these output bitstream portions or output video segments may be combined with other output bitstream portions or output video segments generated by other cluster nodes (e.g., other cloud-based virtual computers, etc.), for example at a central cluster node of the (e.g., cloud-based, etc.) computer cluster, into multiple overall bitstreams or multiple sequences of video segments.

In operational scenarios in which linear encoding mode is used, each of the combined multiple overall bitstreams may comprises a sequence of consecutive output SDR or BL images of a respective spatial resolution and/or a respective bit rate in the bit rate ladder supported by the computer cluster and represent a full version of the media program or video clip at the respective spatial resolution and/or the respective bit rate.

In operational scenarios in which segment encoding mode is used, each of the combined multiple sequences of video segments may comprises a sequence of consecutive video segments each of which comprises a plurality of consecutive output SDR or BL images of a respective spatial resolution and/or a respective bit rate in the bit rate ladder supported by the computer cluster and represent a full version of the media program or video clip at the respective spatial resolution and/or the respective bit rate.

Optimal Film Grain Setting

As previously noted, noise injection such as film grain noise injection can be performed in a single-stage combined processing pipeline/architecture or in the second stage of a two-stage processing pipeline/architecture. Operational parameters for noise injection as described herein may be specifically set for one or more settings or combinations of different spatial resolutions and/or bit rates.

Film grain noise can be constructed using a two-dimensional (2D) random field in a spatial frequency domain. An $\omega_G \times \omega_G$ film grain noise patch $G(m,n)$ can be rendered by:

$$G(m,n) = p \cdot iDCT(Q(x,y)) \qquad (6)$$

where $Q(x,y)$ represent $\omega_G \times \omega_G$ DCT coefficients, where $\omega_G$ is a positive integer; p represent the noise standard deviation for the film grain noise; iDCT(•) represents an inverse DCT operation or operator.

In some operational scenarios, a subset of AC coefficients of $Q(x,y)$ (coefficients with at least one of x or y is non-zero) in the $\omega_G \times \omega_G$ DCT coefficients for the noise patch may be set to Gaussian random numbers of mean 0, standard deviation 1 (or p=1). All other coefficients (including the DC coefficient with both x and y equal to zero) in the $\omega_G \times \omega_G$ DCT coefficients for the noise patch are set to zero.

When a subset of frequency bands in a plurality of spatial frequencies represented in $G(m,n)$ have non-zero AC coefficients in the DCT domain, the noise patch in the pixel domain corresponding to $G(m,n)$ in the DCT domain appear as film grain noise. The lower the frequency bands are distributed with the non-zero AC coefficients, the larger the size of film grains appears. The DCT size ($\omega_G \times \omega_G$) controls the largest available film grain size.

Example noise injection operations including but not limited to film gain noise injection PCT Application Ser. No. PCT/US2019/054299, "Reducing Banding Artifacts in Backward-Compatible HDR Imaging," by Qing Song et al., filed on Oct. 2, 2019, and published as WO 2020/072651, and U.S. Provisional Patent Application Ser. No. 62/950, 466, "Noise synthesis for digital images," by H. Kadu et al., filed on Dec. 19, 2019, the entire content of which is hereby incorporated by reference as if fully set forth herein.

The film grain parameters—such as one or more of: the DCT size ($\omega_G \times \omega_G$), the frequency bands with non-zero AC coefficients, etc.—can be configured by system and/or by designated user.

For example, let $f_s$ and $f_e$ be the starting and ending frequencies in each direction of the 2D directions (horizontal and vertical). These frequencies can be used to control or delimit the non-zero spatial frequencies f as follows: $f_s \leq f \leq f_e$. The starting and ending frequencies, which are operational parameters for film noise injection, can be adjusted according to image spatial resolution and/or (to-be-encoded) bit rate. In some operational scenarios, among or across all different image spatial resolutions, the ratio of the film grain size to image/frame dimension may be roughly or approximately kept the same, for example with an error tolerance of 10% 20%, 30%, or another percentile. Thus, in these operational scenarios, for smaller spatial resolutions, smaller film grains may be used.

Optimal film grain settings can be individually set for film grain noise injection specifically for a respective setting or combination of spatial resolution and/or bit rate in a plurality of settings or combinations of spatial resolutions and/or bit rates.

FIG. 3D illustrates an example 16×16 frequency domain pattern or block. The letter "n" at a subset of frequency positions means that the frequency positions in the subset are set to norm or Gaussian random numbers. Other frequency positions without the letter "n"—outside the subset of frequency positions—are set to zero.

The 16×16 frequency domain pattern or block with the norm or Gaussian random numbers in the subset of frequency positions can be applied with an inverse DCT transform (IDCT) to generate a corresponding film grain patch in the pixel domain. This may be repeated to generate more than one film grain patch. A film grain noise image of a specific spatial resolution with a unity standard deviation can be generated by stitching multiple non-overlapping film grain noise patches.

For 16-bit HDR video signals of the first and second settings or combinations of spatial resolutions and/or bit rates, the minimum and maximum noise strengths can be set as follows: $[\psi_{min}, \psi_{max}] = [500, 1000]$. As the 16-bit HDR video signals have HDR codeword ranges from 0-65535, noise addition or injection to HDR luminance (or luma) codewords to pixels in HDR input or source images can be set with the minimum and maximum noise strengths to be within a range of [500,1000].

In another example, for a third setting or combination of an image spatial resolution of 768×432 and a frame rate of 24 fps at a bit rate of 1 Mbps and a fourth setting or combination of an image spatial resolution of 480×360 and a frame rate of 24 fps at a bit rate of 0.5 Mbps, adding film grain noise may worsen compression performance. This is mainly because noise injected in an image with these settings may make it difficult for a codec such as a standard 8-bit AVC compressor to efficiently represent the image. Thus, images with these resolutions/bitrates in the third and fourth settings or combinations may not be injected with noise in some operational scenarios, as indicated in TABLE 4 above.

Example Process Flows

Figure 4B:
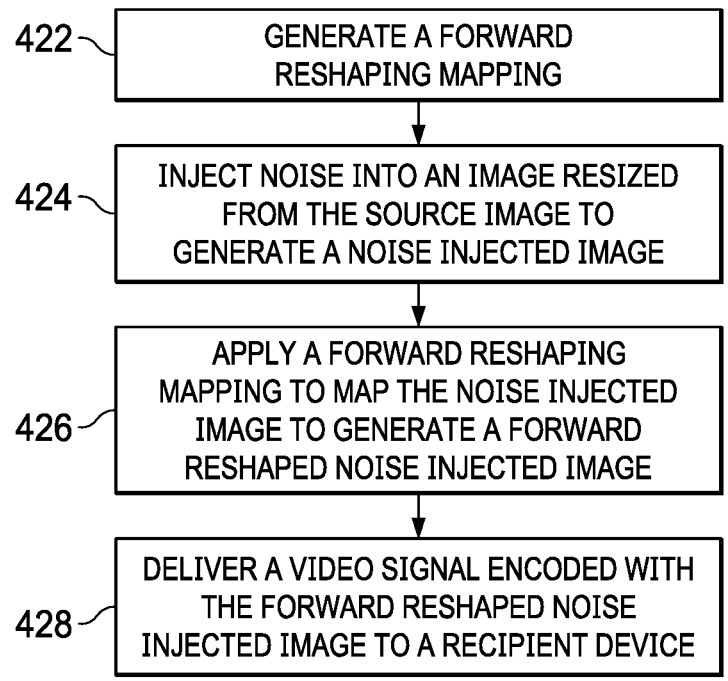

FIG. 4B illustrates an example process flow according to an embodiment. In some embodiments, one or more computing devices or components (e.g., an encoding device/module, a transcoding device/module, a decoding device/module, an inverse tone mapping device/module, a tone mapping device/module, a media device/module, a reverse mapping generation and application system, etc.) may perform this process flow. In block 422, an image processing system generates a forward reshaping mapping to map a source image of a first dynamic range to a corresponding forward reshaped image of a second dynamic range lower than the first dynamic range.

In block 424, the image processing system injects noise into an image of the first dynamic range and of a first spatial resolution to generate a noise-injected image of the first dynamic range and the first spatial resolution. The image of the first dynamic range and the first spatial resolution is generated from spatially downsampling the source-image of the first dynamic range.

In block 426, the image processing system applies the forward reshaping mapping to map the noise injected image of the first dynamic range and the first spatial resolution to generate a noise embedded image of the second dynamic range and the first spatial resolution.

In block 428, the image processing system delivers, to a recipient device, a video signal encoded with the noise embedded image of the second dynamic range and the first spatial resolution for the recipient device to render a display image generated from the noise embedded image.

In an embodiment, the video signal represents a single-layer backward compatible signal.

In an embodiment, the first dynamic range is a high dynamic range; wherein the second dynamic range is a standard dynamic range.

In an embodiment, the video signal is delivered to the recipient device with image metadata that includes a backward reshaping mapping; the display image represents a backward reshaped image of the first dynamic range generated from applying the backward reshaping mapping to the noise embedded image of the second dynamic range and the first spatial resolution.

In an embodiment, the noise is one of: film grain noise or non-film grain noise.

In an embodiment, the noise is injected into the image of the first dynamic range and of the first spatial resolution with luminance-dependent noise strengths computed with the forward reshaping mapping.

In an embodiment, the noise is injected with one or more operational parameters that are configured based on one or more of: the first spatial resolution, a target bit rate used for delivering the video signal to the recipient device, etc.

In an embodiment, the video signal comprises one of: a coded bitstream encoded with a sequence of consecutive noise embedded images of the second dynamic range and the second spatial resolution, a sequence of consecutive video segments each of which comprises a sub-sequence of consecutive noise embedded images of the second dynamic range and the second spatial resolution, etc.

In an embodiment, the image processing system is further configured to perform: injecting second noise into a second image of the first dynamic range and of a second spatial resolution to generate a second noise injected image of the first dynamic range and the second spatial resolution, the second image of the first dynamic range and the second spatial resolution being generated from spatially downsampling the source image of the first dynamic range; applying the same forward reshaping mapping to map the second noise injected image of the first dynamic range and the second spatial resolution to generate a second noise embedded image of the second dynamic range and the second spatial resolution; delivering, to a second recipient device, a second video signal encoded with the second noise embedded image of the second dynamic range and the second spatial resolution for the second recipient device to render a second display image generated from the second noise embedded image.

In an embodiment, the video signal and the second video signal are generated for different combinations of spatial resolutions and bit rates in a plurality of different combinations of spatial resolutions and bit rates in a bit rate ladder supported by a cloud-based media content system.

In an embodiment, the source image of a first dynamic range is provided in an input video signal; a plurality of input video segments is generated from the input video signal; each input video segment in the plurality of input video segments is assigned to a respective cluster node in a plurality of cluster nodes in a cloud-based computer cluster; the respective cluster node processes the input video segment into one of: a plurality of coded bitstream portions of different combinations of spatial resolutions and bit rates, a plurality of output video segments of different combinations of spatial resolutions and bit rates, etc.

Figure 4C:
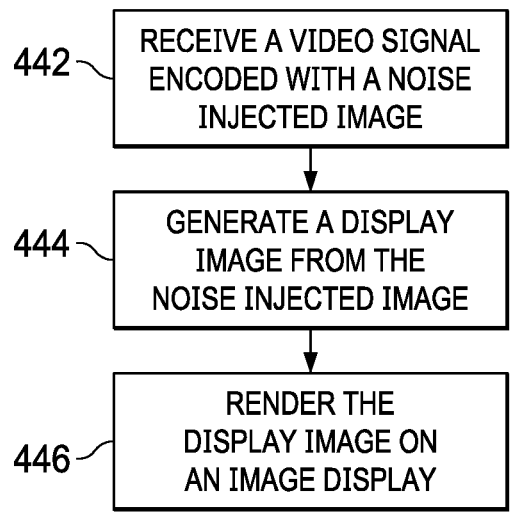

FIG. 4C illustrates an example process flow according to an embodiment. In some embodiments, one or more computing devices or components (e.g., an encoding device/module, a transcoding device/module, a decoding device/module, an inverse tone mapping device/module, a tone mapping device/module, a media device/module, a reverse mapping generation and application system, etc.) may perform this process flow. In block 442, an image processing system receives a video signal generated by an upstream encoder and encoded with a noise embedded image of a second dynamic range and a first spatial resolution, the second dynamic range being lower than a first dynamic range.

The noise embedded image of the second dynamic range and the first spatial resolution has been generated by the upstream encoder applying a forward reshaping mapping to a noise injected image of the first dynamic range and the first spatial resolution.

The noise injected image of the first dynamic range and the first spatial resolution has been generated by the upstream encoder injecting noise into an image of the first dynamic range and of the first spatial resolution; the image of the first dynamic range and the first spatial resolution is generated from spatially downsampling a source image of the first dynamic range.

In block 444, the image processing system generates a display image from the noise embedded image of the second dynamic range and the first spatial resolution.

In block 446, the image processing system renders the display image on an image display.

In an embodiment, the video signal is received with image metadata that includes a backward reshaping mapping; the display image represents a noise injected image of the first dynamic range and the first spatial resolution; the image processing system is further configured to perform: applying the backward reshaping mapping to the noise embedded image of the second dynamic range and the first spatial resolution to generate the display image.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the disclosure. For example, one or more processors in a display, an encoder, a set top box, a transcoder or the like may implement methods related to adaptive perceptual quantization of HDR images as described above by executing software instructions in a program memory accessible to the processors. Embodiments of the invention may also be provided in the form of a program product. The program product may comprise any non-transitory medium which carries a set of computer-readable signals comprising instructions which, when executed by a data processor, cause the data processor to execute a method of an embodiment of the invention. Program products according to embodiments of the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
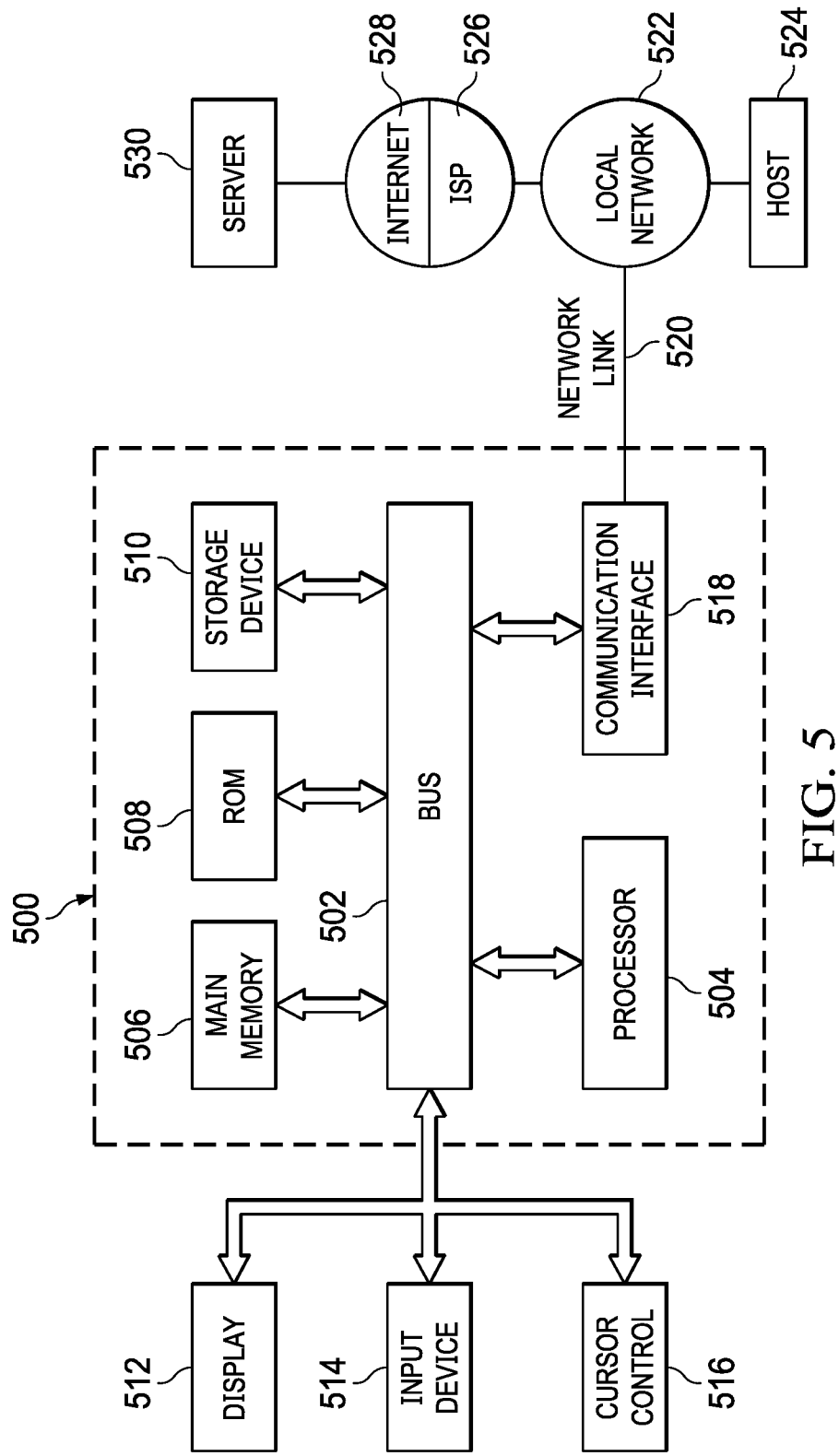
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Equivalents, Extensions, Alternatives and Miscellaneous

In the foregoing specification, embodiments of the invention have been described with reference to numerous specific details that may vary from implementation to implementation. Thus, the sole and exclusive indicator of what is claimed embodiments of the invention, and is intended by the applicants to be claimed embodiments of the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for encoding an image into a video signal, comprising:
    in a first stage, performing:
        generating a forward reshaping mapping to map a source image of a first dynamic range to a corresponding forward reshaped image of a second dynamic range lower than the first dynamic range; and
    in a second stage, performing:
        generating, by spatially downsampling the source image of the first dynamic range, an image of the first dynamic range and of a first spatial resolution;
        computing, using the forward reshaping mapping, a luminance-dependent noise strength;
        injecting noise with the luminance-dependent noise strength into the image of the first dynamic range and of the first spatial resolution to generate a noise injected image of the first dynamic range and the first spatial resolution;
        applying the forward reshaping mapping to map the noise injected image of the first dynamic range and the first spatial resolution to generate a noise embedded image of the second dynamic range and the first spatial resolution; and
        encoding into a video signal the noise embedded image of the second dynamic range and the first spatial resolution.

2. The method of claim 1, wherein computing, using the forward reshaping mapping, a luminance-dependent noise strength comprises:
    partitioning the first dynamic range into a number of bins;
    determining respective per-bin codeword increases from the forward reshaping mapping;
    normalizing the per-bin codeword increases using the maximum per-bin codeword increase; and
    assigning noise strengths according to the per-bin codeword increases.

3. The method of claim 1, further comprising:
    in the first stage, performing:
        generating a forward binary file, wherein the forward binary file comprises operational parameters or coefficients specifying the forward reshaping mapping; and
        passing the forward binary file to the second stage, and
    in the second stage, performing:
        receiving the forward binary file from the first stage; and
        using the forward binary file to determine the luminance-dependent noise strength.

4. The method of claim 1, wherein the video signal represents a single-layer backward compatible signal.

5. The method of claim 1, wherein the first dynamic range is a high dynamic range and the second dynamic range is a standard dynamic range.

6. The method of claim 1, further comprising:
    delivering the video signal to a recipient device with image metadata that includes a backward reshaping mapping;
    decoding from the video signal, by the recipient device, the noise embedded image of the second dynamic range and the first spatial resolution;
    applying, by the recipient device, the backward reshaping mapping to the noise embedded image of the second dynamic range and the first spatial resolution to generate a backward reshaped image of the first dynamic range; and
    rendering, by the recipient device, a display image representing the backward reshaped image of the first dynamic range.

7. The method of claim 1, wherein the noise is one of: film grain noise or non-film grain noise.

8. The method of claim 1, wherein the noise is injected with one or more operational parameters that are configured based on one or more of: the first spatial resolution, or a target bit rate.

9. The method of claim 1, wherein the video signal comprises one of: a coded bitstream encoded with a sequence of consecutive noise embedded images of the second dynamic range and the first spatial resolution, or a sequence of consecutive video segments each of which comprises a sub-sequence of consecutive noise embedded images of the second dynamic range and the first spatial resolution.

10. The method of claim 1, further comprising:
    in the second stage, performing:
        generating, by spatially downsampling the source image of the first dynamic range, an image of the first dynamic range and of a second spatial resolution;
        computing, with the forward reshaping mapping, a luminance-dependent noise strength;
        injecting noise with the luminance-dependent noise strength into the image of the first dynamic range and of the second spatial resolution to generate a noise embedded image of the first dynamic range and the second spatial resolution;
        applying the forward reshaping mapping to map the noise injected image of the first dynamic range and the second spatial resolution to generate a noise embedded image of the second dynamic range and the second spatial resolution; and encoding into a second video signal the noise embedded image of the second dynamic range and the second spatial resolution.

11. The method of claim 10, wherein the video signal and the second video signal are generated for different spatial resolutions and/or bit rates in a plurality of different spatial resolutions and/or bit rates in a bit rate ladder supported by a cloud-based media content system.

12. The method of claim 1, wherein the source image of the first dynamic range is provided in an input video signal; wherein a plurality of input video segments is generated from the input video signal; wherein each input video segment in the plurality of input video segments is assigned to a respective cluster node in a plurality of cluster nodes in a cloud-based computer cluster; wherein the respective cluster node processes the input video segment into one of: a plurality of coded bitstream portions of different spatial resolutions and/or bit rates, or a plurality of output video segments of different spatial resolutions and/or bit rates.

13. A method for rendering an image, comprising:
receiving, by a recipient device, a video signal generated by the method of claim 1 with image metadata that includes a backward reshaping mapping;
decoding from the video signal, by the recipient device, the noise embedded image of the second dynamic range and the first spatial resolution;
applying, by the recipient device, the backward reshaping mapping to the noise embedded image of the second dynamic range and the first spatial resolution to generate a backward reshaped image of the first dynamic range; and
rendering, by the recipient device, a display image representing the backward reshaped image of the first dynamic range.

14. An apparatus comprising a processor and configured to perform the method recited in claim 1.

15. A non-transitory computer-readable storage medium having stored thereon computer-executable instructions for executing a method with one or more processors in accordance with the method recited in claim 1.

* * * * *